(12) United States Patent
Hertrich et al.

(10) Patent No.: US 7,739,701 B1
(45) Date of Patent: Jun. 15, 2010

(54) DATA STORAGE CARTRIDGE LOADING AND UNLOADING MECHANISM, DRIVE DOOR MECHANISM AND DATA DRIVE

(75) Inventors: Gregory Peter Hertrich, Longmont, CO (US); David Schoenfeld, Thornton, CO (US); Keith Malang, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 1240 days.

(21) Appl. No.: 11/283,864

(22) Filed: Nov. 22, 2005

(51) Int. Cl.
*G11B 17/03* (2006.01)
(52) U.S. Cl. .................................................. 720/635
(58) Field of Classification Search ................ 720/633, 720/635
See application file for complete search history.

(56) References Cited

U.S. PATENT DOCUMENTS

| | | | |
|---|---|---|---|
| 4,866,693 A * | 9/1989 | Odawara et al. | 720/633 |
| 4,896,312 A * | 1/1990 | Odawara et al. | 720/644 |
| 5,058,124 A | 10/1991 | Cameron et al. | |
| 5,126,899 A * | 6/1992 | Kanazawa | 360/99.07 |
| 5,526,337 A | 6/1996 | Housey et al. | |
| 5,719,691 A | 2/1998 | Curtis et al. | |
| 5,748,606 A | 5/1998 | Nakagawa et al. | |
| 5,764,612 A | 6/1998 | Tanaka et al. | |
| 6,047,008 A | 4/2000 | Funakawa | |
| 6,052,256 A * | 4/2000 | Kawakami | 360/99.06 |
| RE36,709 E * | 5/2000 | Matsumoto et al. | 369/13.2 |
| 6,118,618 A * | 9/2000 | Kumakura | 360/99.02 |
| 6,191,875 B1 | 2/2001 | Curtis et al. | |
| 6,201,782 B1 | 3/2001 | Tanaka et al. | |
| 6,249,504 B1 | 6/2001 | Iwanaga | |
| 6,274,459 B1 | 8/2001 | Chan | |
| 6,388,983 B1 | 5/2002 | Kikuchi | |

(Continued)

OTHER PUBLICATIONS

PCT/US2007/06094 International Search Report and the Written Opinion of the International Searching Authority, or the Declaration, mailed Aug. 22, 2008.

(Continued)

*Primary Examiner*—David D Davis
(74) *Attorney, Agent, or Firm*—Vedder Price P.C.; Ajay A. Jagtiani

(57) ABSTRACT

The present invention provides loading and unloading mechanisms for data storage cartridges, drive door mechanisms for data drives, and data drives comprising such loading and unloading and/or drive door mechanisms. Embodiments of the cartridge loading and unloading mechanisms, drive door mechanisms and/or data drives, of the present invention can operate in a manner such that the drive door of the data drive is fully closed before the disk medium is exposed, e.g., before opening of the associated shutter of the cartridge. An embodiment of the cartridge loading and unloading mechanism of the present invention can be powered by the same drive motor assembly that is used to move or transport the cartridge to the optical head assembly used for writing and/or reading of data from the disk medium of the cartridge. Embodiments of the cartridge loading and unloading mechanisms and drive door mechanisms of the present invention can fit within a standard configuration for a data drive. Embodiments of the cartridge loading and unloading mechanisms, drive door mechanisms and/or data drives of the present invention can provide for reliable operation, ease of assembly, as well as simplification of the parts and components necessary for the reliable operation of the loading and unloading mechanism, drive door mechanism and/or data drive.

33 Claims, 15 Drawing Sheets

U.S. PATENT DOCUMENTS

| | | |
|---|---|---|
| 6,414,763 B1 | 7/2002 | Hesselink et al. |
| 6,449,627 B1 | 9/2002 | Baer et al. |
| 6,614,566 B1 | 9/2003 | Curtis et al. |
| 6,973,661 B2 * | 12/2005 | Kanada et al. ............. 720/633 |
| 7,092,133 B2 | 8/2006 | Anderson et al. |
| 2005/0028180 A1 | 2/2005 | Hertrich |
| 2005/0028185 A1 | 2/2005 | Hertrich |
| 2005/0028186 A1 | 2/2005 | Hertrich |

OTHER PUBLICATIONS

PCT/US2006/19906 International Search Report and the Written Opinion of the International Searching Authority, or the Declaration, mailed Sep. 16, 2008.

* cited by examiner

DATA STORAGE CARTRIDGE LOADING AND UNLOADING MECHANISM, DRIVE DOOR MECHANISM AND DATA DRIVE

BACKGROUND

1. Field of the Invention

The present invention relates generally to loading and unloading mechanisms, and more particularly, to a loading and unloading mechanism for a data storage cartridge, as well as to drive door mechanisms for data drives, and data drives comprising such loading and unloading mechanisms and/or drive door mechanisms.

2. Related Art

Data storage cartridges have been used to house removable data storage media. The cartridge typically comprises a housing that serves as a protective enclosure for a disk medium. In the past, this disk medium has been in the form of a magneto-optical (MO) disk medium. However, another type of data storage system known as holographic storage, is described in for example in U.S. Pat. No. 5,719,691 (Curtis et al.), issued Feb. 17, 1998, and U.S. Pat. No. 6,191,875 (Curtis et al.), issued Feb. 20, 2001. It may be desirable that the holographic data storage (HDS) medium be provided in a disk form and housed in a cartridge similar to those used for an MO disk medium. This enables HDS manufacturers to utilize existing MO cartridge designs and handling mechanisms for easy conversion to HDS applications.

These removable data storage cartridges typically comprise a disk-shaped data storage medium having a rotatable hub provided at the center of the disk, and are inserted into data storage drives that can read data from and write data to such removable data cartridges. Some data storage drives include a "soft load" mechanism, which receives a data cartridge inserted into a load port of the drive, and translates the cartridge to couple the hub in the data cartridge with a spindle mechanism in the drive. The loading mechanism typically translates the cartridge first in a lateral direction to draw the cartridge fully into the drive, and second in a downward direction to lower the cartridge onto the stationary spindle. After coupling, the spindle rotates the data storage medium past a radially positionable read/write head, which can read data from and/or write data to various locations on the data storage medium.

In a conventional HDS drive system, the HDS cartridge is inserted through the drive door of the data drive. After insertion, a sensor is typically triggered to indicate that the HDS cartridge may be loaded onto the drive spindle. The mechanism for loading (as well as unloading) the cartridge onto the drive spindle is typically powered by one motor with the proper gear reduction necessary to overcome the forces required for either loading or unloading the cartridge. Another separate motor is then typically used to move or transport the loaded cartridge underneath a stationary optical head assembly used to write and/or read data from the disk medium within the HDS cartridge. This transporting/loading process is then reversed to unload or eject the HDS cartridge from the data drive.

At some point during the loading of the HDS cartridge and transportation underneath the optical head assembly, a shutter associated with the cartridge is typically opened to expose the disk medium for writing and/or reading of data by the optical head assembly. For HDS cartridges, it is important that the loading/unloading mechanism for the cartridge operate in a manner such that the drive door of the data drive is fully closed before this shutter is opened. In addition, the loading/unloading mechanism for the HDS cartridge should desirably fit within the standard configuration for a data drive, which is typically a width of no more than about 5.75 inches (14.61 cm.) and a height of no more than about 3.25 inches (8.26 cm). Further, the cartridge loading/unloading mechanism should provide for reliable operation, as well as ease of assembly.

SUMMARY

According to a first broad aspect of the present invention, there is provided a device comprising:

a data storage cartridge loading and unloading mechanism having a cartridge carrier for releasably receiving a data cartridge and for moving the data cartridge towards or away from a data cartridge coupler and for moving the data cartridge laterally between cartridge loaded and unloaded positions;

wherein the cartridge carrier moves the data cartridge towards or away from the data cartridge coupler and moves the data cartridge laterally between cartridge loaded and unloaded positions in response to the lateral movement of a carrier transporter.

According to a second broad aspect of the present invention, there is provided a data storage cartridge loading and unloading mechanism for a data drive comprising a drive door assembly having a drive door movable between closed and opened positions, a data cartridge coupler associated with the loading and unloading mechanism, a pair of spaced apart carrier cam slots, and a pair of door cams each having a cam pin for causing the drive door to move between closed and opened positions, the loading and unloading mechanism comprising:

a cartridge carrier for releasably receiving the data cartridge and for moving the data cartridge towards or away from the data cartridge coupler, and having a pair of spaced apart sides, each side rotatably mounting a pair of laterally spaced apart cam rollers;

a pair of laterally spaced apart carrier guides each having an interior and exterior and receiving the cartridge carrier between the interiors of the carrier guides, each carrier guide further having:

a pair of laterally spaced apart cartridge carrier cam slots aligned along the same longitudinal axis; and a drive door cam slot for receiving a drive door cam actuating member of one of the drive door cams and for actuating the drive door cam;

a pair of carrier cam assemblies, each carrier cam assembly associated with the exterior of one of the carrier guides and having a carrier cam member that is receivable by and for engaging one of the carrier cam slots when received thereby;

wherein each of the cam rollers extends through and is movable within one of cartridge carrier cam slots and which engages one of the carrier cam assemblies associated with the carrier guide of the one cartridge carrier cam slot so that the one carrier cam assembly can move the cartridge carrier towards or away from the data cartridge coupler;

wherein when the loading and unloading mechanism moves towards the drive door assembly and towards an unloading position:

each cartridge carrier cam slot engages the one cam roller so that the cartridge carrier moves towards the drive door assembly and towards the cartridge unloading position;

each carrier cam assembly causes the cartridge carrier to move away from the data cartridge coupler and to an uncoupled position; and each drive door cam slot receives the one drive door cam actuating member and actuates the one drive door cam to a drive door opened position;

wherein when the loading and unloading mechanism moves away from the drive door assembly and towards a loading position:

each cartridge carrier cam slot engages the one cam roller so as to cause the cartridge carrier to move away from the drive door assembly and towards the cartridge loading position;

each carrier cam assembly causes the cartridge carrier to move towards the data cartridge coupler and to a coupled position; and each drive door cam slot engages the one drive door cam actuating member and actuates the one drive door cam to a drive door closed position.

According to a third broad aspect of the present invention, there is provided a data drive comprising:

a drive door assembly having a data cartridge load port and a drive door having spaced apart ends and being pivotally mounted for movement between drive door closed and opened positions to cover or uncover the load port;

at least one drive door cam pivotally mounted for movement between the drive door closed and opened positions, and having a drive door actuating cam member and a drive door cam actuating member;

wherein at least one end of the drive door comprises a cam profile having a cam member that includes a cam surface for being engaged by and responsive to movement of the drive door actuating cam member for moving the drive door between closed and opened positions, and a locking member having a locking notch for receiving the drive door actuating cam member when the drive door has moved to a closed position.

According to a fourth broad aspect of the present invention, there is provided a data drive comprising:

a data cartridge coupler;

a carrier transporter having the data cartridge coupler associated therewith and movable laterally between cartridge loaded and unloaded positions;

a drive motor assembly for causing the carrier transporter to move laterally between cartridge loaded and unloaded positions;

a data storage cartridge loading and unloading mechanism having a cartridge carrier for releasably receiving a data cartridge and for moving the data cartridge towards or away from the data cartridge coupler and for moving the data cartridge laterally between cartridge loaded and unloaded positions;

wherein the cartridge carrier moves the data cartridge towards or away from the data cartridge coupler and moves the data cartridge laterally between cartridge loaded and unloaded positions in response to lateral movement of the carrier transporter.

BRIEF DESCRIPTION OF THE DRAWINGS

The invention will be described in conjunction with the accompanying drawings, in which.

DETAILED DESCRIPTION

Figure 1:
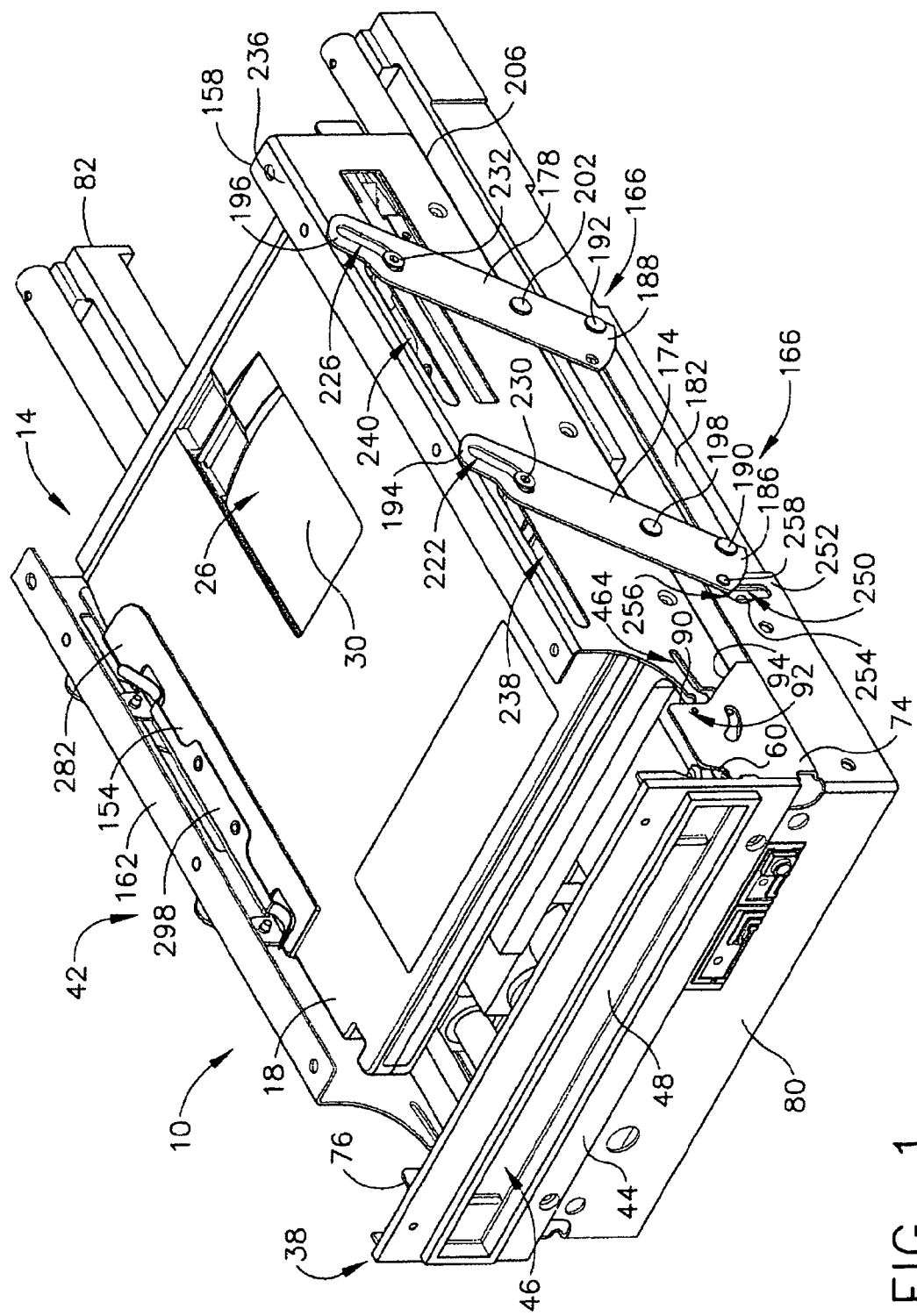
FIG. 1 is a perspective view of a data drive showing an embodiment of a data cartridge loading and unloading mechanism, drive door mechanism, and data drive of the present invention with the data storage cartridge in a loaded position.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "data storage cartridge" refers to a magneto-optical (MO) data storage cartridge, a holographic data storage (HDS) cartridge, etc., that typically comprises a protective housing and a disk medium for writing and/or reading data that is usually movable, and is typically rotatable, within the housing. For data storage cartridges containing a rotatable disk medium, such as HDS cartridges, the data storage cartridge is usually coupled with a rotatable data cartridge coupler (e.g., a data cartridge drive spindle, etc.) that rotates the disk medium within the housing.

For the purposes of the present invention, the term "data cartridge coupler" refers to a component or mechanism that the data storage cartridge is coupled with when in a loaded position. The data cartridge coupler usually moves, or more typically rotates, the disk medium within the data storage cartridge, e.g., a data cartridge drive spindle, etc.

For the purposes of the present invention, the term "data drive" refers to a system, assembly, device, etc., into which a data storage cartridge is inserted for loading/unloading of the cartridge, writing and/or reading data from the disk medium within the cartridge, etc.

For the purposes of the present invention, the term "cartridge loading and unloading mechanism" refers to a mechanism used to load/couple, unload/uncouple, or more typically reversibly load/couple and unload/uncouple a data storage cartridge to or from a data cartridge coupler after insertion into a data drive.

For the purposes of the present invention, the term "drive door mechanism" refers to those components related to the operation of the drive door assembly, including the drive door assembly and its components, the drive door cams, etc., and typically involved in moving the drive door from a closed position (e.g., wherein a data cartridge load port is covered) to an opened position (e.g., wherein a data cartridge load port is uncovered), as well as any partially closed or partially opened position therebetween.

For the purposes of the present invention, the terms "unloading" and "ejecting" and similar terms are used interchangeably herein to refer to when the data cartridge is moved or otherwise positioned within or at the load port for manual removal from the data drive.

For the purposes of the present invention, the term "write/read head" refers to any device, assembly, mechanism, etc., that can write and/or read data to and/or from the disk medium within the data storage cartridge.

DESCRIPTION

The present invention provides loading and unloading mechanisms, drive door mechanisms for data drives, and data drives comprising such loading and unloading mechanisms and/or drive door mechanisms for data storage cartridges. Embodiments of the present invention relate to loading and unloading mechanisms and/or a drive door mechanisms for a data storage cartridge that operates in a manner such that the drive door of the data drive is fully closed before the disk medium is exposed, e.g., before opening of the associated shutter of the cartridge. An embodiment of the present invention also relates to a loading and unloading mechanism for a data storage cartridge that can be powered by the same drive motor assembly that is used to move or otherwise transport the cartridge reversibly to and from the write/read head assembly used for writing and/or reading of data from the disk medium of the cartridge. Embodiments of the present invention further relate to loading and unloading mechanisms, and drive door mechanisms for data storage cartridges that can fit within a standard configuration for a data drive (e.g., in terms of width of the data drive). Embodiments of the present invention further relate to loading and unloading mechanisms, drive door mechanisms and/or data drives for data storage cartridges that provide for reliable operation, ease of assembly, as well as simplification of the parts and components necessary for the reliable operation of the loading and unloading mechanism, drive door mechanism and/or data drive.

Figure 2:
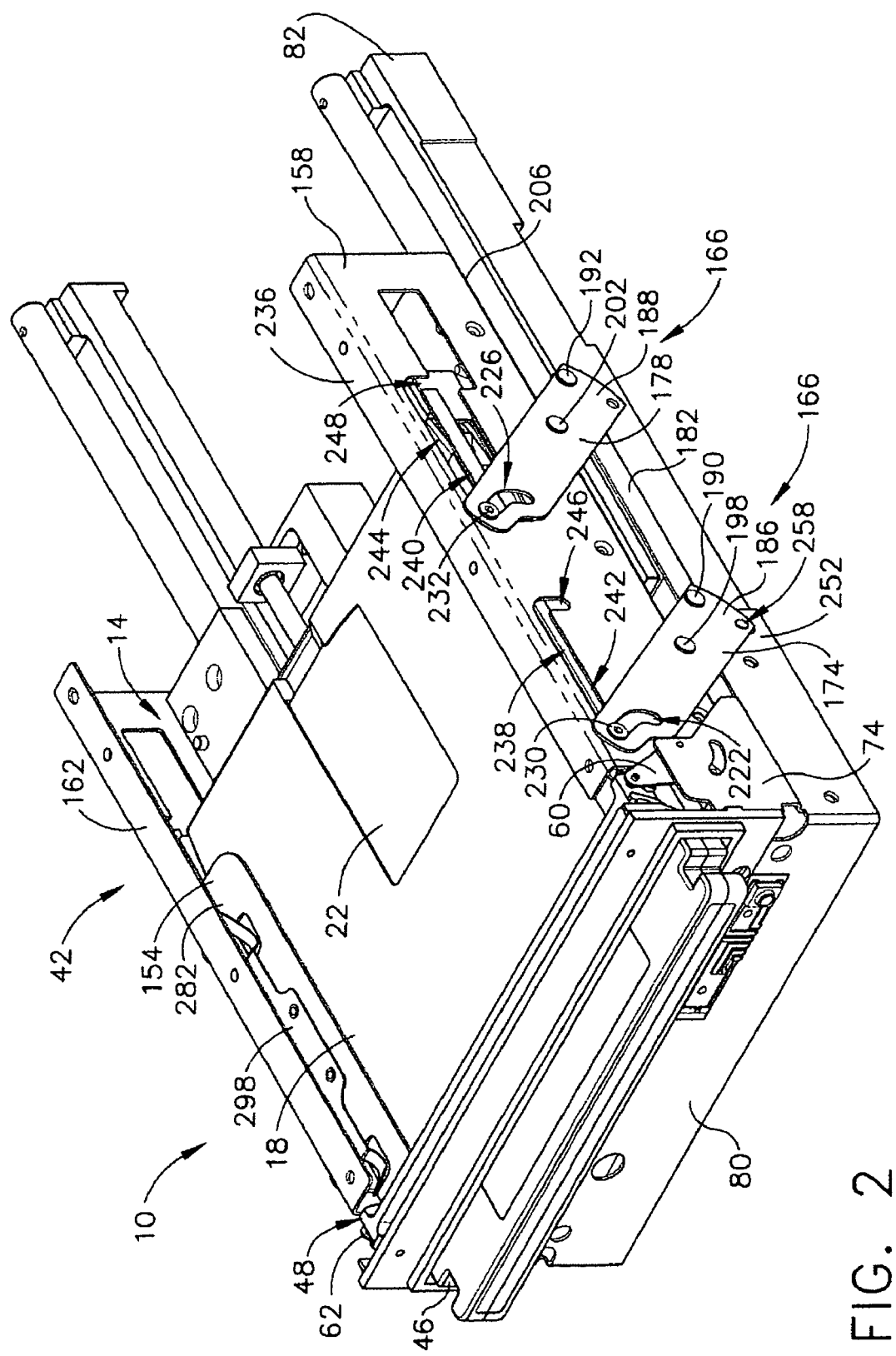
FIG. 2 is an another perspective view showing an embodiment of a cartridge loading and unloading mechanism, drive door mechanism, and data drive of the present invention with the cartridge in an unloaded or ejected position.

The various embodiments of the present invention are illustrated by reference to the drawings. Referring to FIGS. 1 and 2, a data drive is indicated generally as 10 that may be provided as part of, for example, a data cartridge library or other computer system. Data drive 10 reversibly receives a typically and generally square-shaped data storage cartridge indicated generally as 14 that is shown in FIG. 1 in a loaded configuration or position, and in FIG. 2 in an unloaded or ejected configuration or position. Data storage cartridge 14 typically comprises a protective housing indicated as 18 that is provided with a shutter 22 (see FIG. 2) that, when opened, uncovers upper disk medium aperture 26 (see FIG. 1) to uncover or expose a portion of a generally circular disk medium 30 that rotates within housing 18. There is also typically a corresponding disk medium aperture (not shown) on the underside of housing 18.

Figure 3:
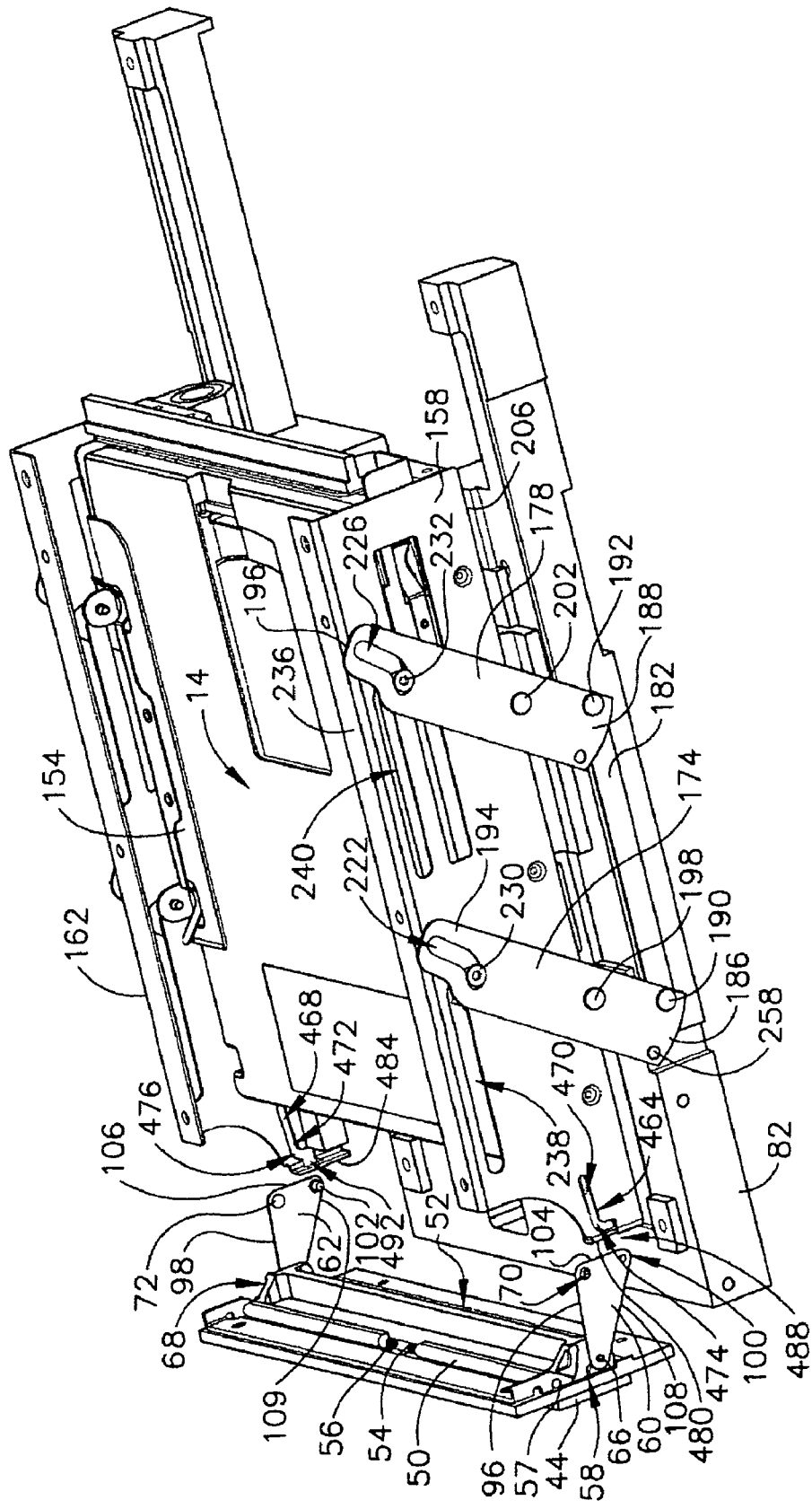
FIG. 3 is a perspective view of the drive door assembly and the front portion of the cartridge loading and unloading mechanism, drive door mechanism, and data drive of FIGS. 1 and 2, with other components of the data drive removed for clarity.

Referring to FIGS. 1-3, data drive 10 comprises a drive door assembly indicated generally as 38 and a cartridge loading and unloading ("loader/unloader") mechanism indicated generally as 42 which is configured to move or otherwise translate cartridge 14 laterally from a loaded position to an unloaded/ejected position and from an unloaded/ejected position to a loaded position, i.e., loading and unloading/ejecting of cartridge 14 is generally reciprocal and reversible. Drive door assembly 38 includes a drive bezel 44 having a generally rectangular shaped opening in the form of data cartridge load port 46 through which cartridge 14 can be inserted and removed, and drive door 48 to cover load port 46 when door 48 is in a closed position. Drive door 48 has an upper edge 50 and a lower edge 52. Mounted along the upper edge 50 of drive door 48 are a pair of outwardly extending spring mounting members indicated generally as 54 and 56 for locating a biasing or urging member such as a torsion spring (not shown) which biases or urges the drive door 48 towards the closed position. Drive door 48 is mounted at its respective ends on drive bezel 44 by pivot pins, one of which is shown and indicated as 57. Drive door 48 pivots upwardly and counterclockwise towards an opened position to uncover load port 46, or clockwise and downwardly towards a closed position to cover load port 46, about the axis defined by the pivot pins (e.g., pin 57) mounting door 48 on bezel 44.

As shown in FIG. 3, each end of drive door 48 has door opening and locking cam profiles protruding outwardly therefrom, one of which is shown and is indicated generally as 58, and is described in greater detail below. Referring to FIGS. 1-3, drive door assembly 38 interacts with other components of the drive door mechanism, including a pair of spaced apart and generally triangular-shaped drive door cams 60 and 62, each having cam pins at respective forward corners 66 and 68 that cooperate with the respective cam profile (e.g., cam profile 58), as described below. Respective right angle corners 70 and 72 of door cams 60 and 62 are pivotally mounted by pivot pins (as described below) on respective laterally spaced apart drive door cam supports 74 and 76 that extend generally upwardly from door cam support bracket 80 that is mounted on or otherwise attached at the forward end of base plate 82, with door assembly 38 (e.g. bezel 44) typically being mounted on bracket 80. As shown in FIGS. 1 and 2 with respect to support 74, corner 70 of door cam 60 is pivotally mounted on upper rearward portion 90 of support 74 by a pivot pin indicated generally as 92 just above rearwardly slanting lower bevel portion 94; door cam 62 is similarly pivotally mounted at or proximate corner 72 on support 76. As shown in FIG. 3, corners 66 and 68 are connected to right angle corners 70 and 72 by respective upper edges 96 and 98 of door cams 60 and 62. Door cams 60 and 62 also have lower rearward corners indicated as 100 and 102 that are connected to right angle corners 70 and 72 by respective rearward edges 104 and 106 of door cams 60 and 62, and are also connected to forward corners 66 and 68 by respective lower edges 108 and 109.

In order to pivot drive door 48 towards an opened position (i.e., upwardly and counterclockwise), door cams 60 and 62 pivot clockwise about an axis defined by corners 70 and 72 such that forward corners 66 and 68 move upwardly in response thereto (see FIGS. 2 and 3). When drive door 48 is fully opened, lower edges 108 and 109 of door cams 60 and 62 are shown in FIG. 2 as being perpendicular or approaching perpendicular relative to base plate 82. Conversely, in order to pivot drive door 48 towards a closed position (i.e., downwardly and clockwise), door cams 60 and 62 pivot counterclockwise about the axis defined by corners 70 and 72 such that forward corners 66 and 68 move downwardly in response thereto (see FIGS. 1 and 3). When drive door 48 is fully closed, upper edges 96 and 98 of door cams 60 and 62 are shown in FIGS. 1 and 3 as being parallel or substantially parallel to base plate 82, while rearward edges 104 and 106 of door cams 60 and 62 are shown in FIGS. 1 and 3 as being perpendicular or substantially perpendicular to base plate 82.

Figure 4:
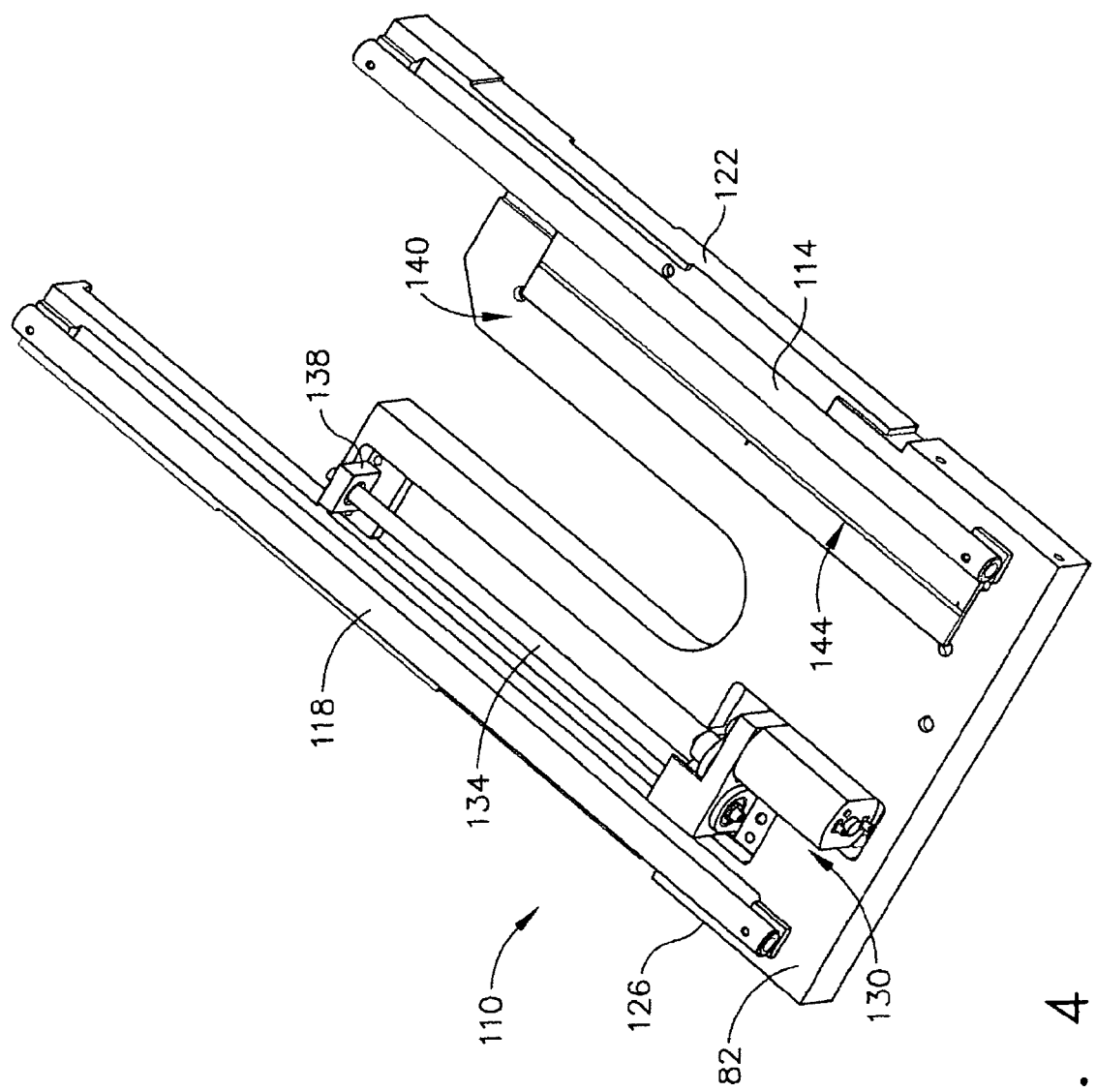
FIG. 4 is a perspective view of an embodiment of the drive base assembly of the data drive of FIGS. 1 and 2.

Referring to FIG. 4, data drive 10 further includes a drive base assembly indicated generally as 110 that includes base plate 82. Mounted on or otherwise attached to base plate 82 is a pair of laterally spaced apart and generally parallel elongated and generally cylindrical sled rails or guides indicated as 114 and 118 that are proximate and extend generally parallel to respective edges 122 and 126 of base plate 82. The drive base assembly further includes a drive motor assembly comprising a motor and gear drive assembly indicated generally as 130 that is mounted on or otherwise attached to the forward end of base plate 82 adjacent to or proximate sled guide 118. Assembly 130 causes the reciprocal and reversible rotation of a lateral movement transfer member in the form of rotatable elongated lead screw 134. Lead screw 134 is received at its distal and opposite end from assembly 130 by a bearing block 138 mounted on or otherwise attached to base plate 82. Also shown in FIG. 4 is a generally rectangular-shaped linear encoder indicated generally as 140 mounted on or otherwise attached to base plate 82 proximate or adjacent to sled guide 114 and having a sensing portion indicated as 144.

Referring to FIGS. 1 and 2, cartridge loader/unloader mechanism 42 includes a cartridge carrier indicated as 154, a pair of laterally and generally parallel spaced apart carrier guides 158 and 162 that extend generally parallel relative to base plate 82. Each carrier guide 158 and 162 have an interior and exterior with cartridge carrier 154 being received between the interiors of carrier guides 158 and 162. Cartridge loader/unloader mechanism 42 also comprises a carrier cam assembly associated with the exterior of each of carrier guides 158 and 162. One carrier cam assembly associated with carrier guide 158 is shown and indicated generally as 166; a similarly configured and constructed carrier cam assembly (not shown in FIG. 1 or 2) is also associated with the exterior of carrier guide 162. Carrier cam assembly 166 comprises a pair of laterally spaced apart and elongated carrier cams that extend generally transversely relative to carrier guide 158. The forward or leading carrier cam of assembly 166 is indicated generally as 174, while the rearward or trailing carrier cam is indicated generally as 178. Carrier cam assembly 166 further comprises an elongated linking member 182 that extends generally parallel to base plate 82. Linking member 182 is pivotally connected at each end to the respective lower ends 186 and 188 of carrier cams 174 and 178 by rearwardly located pivot pins indicated as 190 and 192 such that, for example, rearward carrier cam 178 responds or moves synchronously or simultaneously to or with the movement of forward carrier cam 174, and vice versa.

As shown in FIGS. 1 and 2, carrier cams 174 and 178 are each pivotally mounted between respective lower ends 186 and 188 and upper ends 194 and 196, and typically proximate the middle section of carrier cams 174 and 178 by respective pivot pins indicated as 198 and 202 that extend outwardly from and at or proximate the bottom guide edge 206 of carrier guide 158, such that the upper ends 194 and 196 of carrier cams 174 and 178 can each pivot or swing forwardly (i.e., counterclockwise) or rearwardly (i.e., clockwise) about axes defined by respective pivot pins 198 and 202. As shown in FIGS. 1 and 2, upper ends 194 and 196 of carrier cams 174 and 178 are each provided with a generally arcuate cam roller slot indicated as 222 or 226 that extends generally in the direction of the longitudinal axis of the respective cam carrier 174 or 178. Slots 222 and 226 receive, respectively, a forward or leading cam roller 230 and a rearward or trailing cam roller 232 that extend or protrude outwardly from cartridge carrier 154 such that carrier 154 is movably mounted on and engaged by carrier cams 174 and 178 (as described below). If desired, slots 222 and 226 can each be provided with an access aperture (not shown) sized slightly larger than the width of slots 222 and 226 for insertion or removal of the ends of cam rollers 230 and 232 into slots 222 and 226 such that cartridge carrier 154 can be reversibly coupled to, or decoupled from, carrier cams 174 and 178.

As also shown if FIGS. 1 and 2, each of cam rollers 230 and 232 extend or protrude through one of a pair of laterally spaced apart, generally L-shaped cartridge cam carrier slots formed adjacent or proximate the upper guide edge 236 of carrier guide 158 and are indicated, respectively, as forward or leading cartridge carrier cam slot 238 and rearward or trailing cartridge carrier cam slot 240. As shown in FIGS. 1 and 2, the forward and longer longitudinal slot segments 242 and 244 of each of respective cartridge carrier cam slots 238 and 240 are typically aligned or encompassed by the same longitudinal axis of carrier guide 158 that typically extends generally parallel relative to upper guide edge 236. As also shown in FIG. 1 and especially FIG. 2, each cartridge carrier cam slot 238 and 240 also has respective rearward and shorter transverse cam slot segments 246 or 248 that extend transversely, and typically generally perpendicular, at the rearward or trailing end of respective longitudinal cam slot segments 242 and 244, and generally downward or toward bottom guide edge 206.

As further shown in FIGS. 1 and 2, drive door cam supports 74 and 76 are each provided with a generally upside-down J-shaped or L-shaped carrier cam slot at the lower rearward portion thereof. One such carrier cam slot is indicated as 250 in FIGS. 1 and 2 and is formed in the lower rearward portion 252 of drive door cam support 74. As further shown in FIGS. 1 and 2, the curved portion 254 of slot 250 initially extends generally upwardly and away from base plate 82, and then rearwardly towards an upper slot access opening 256. Slot access opening 256 is sized to receive a carrier cam pin indicated as 258 (mounted or otherwise attached at the front of lower end 186 of carrier cam 174) when loader/unloader mechanism 42 moves laterally forward or towards drive door assembly 38 to the unloading or ejecting position for mechanism 42, as described below.

Figure 5:
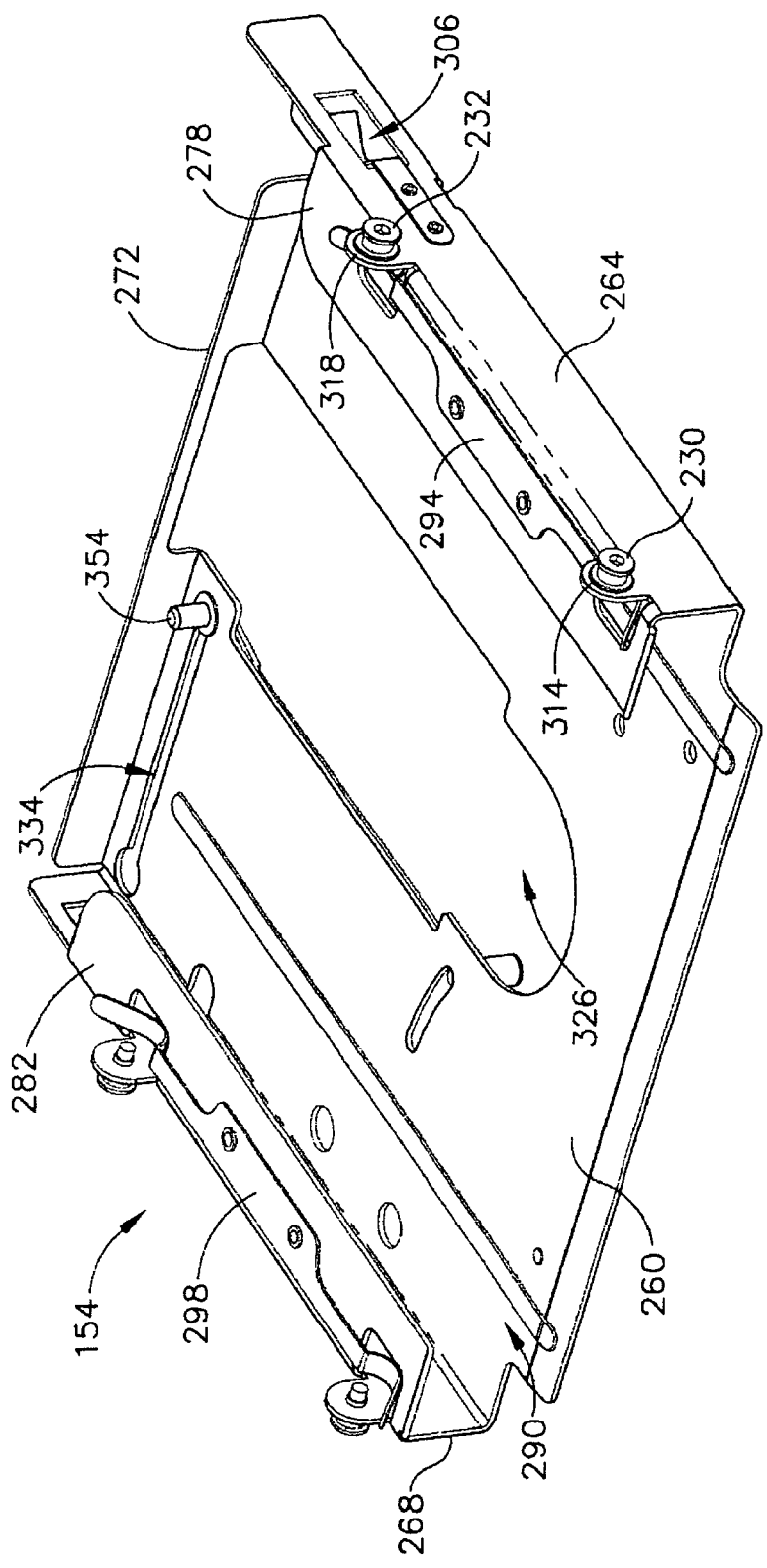
FIG. 5 is a perspective view of the upper side of an embodiment of the cartridge carrier of the cartridge loading and unloading mechanism of FIGS. 1 and 2.

Referring to FIG. 5, cartridge carrier 154 comprises a generally square-shaped bottom portion indicated generally as 260, a pair of spaced apart generally rectangular-shaped sides 264 and 268 extending generally upwardly and transversely from each side edge of bottom portion 260, a generally rectangular-shaped rear portion 272 connected to and extending generally upwardly and transversely from the back or rear edge of bottom portion 260, and a pair of laterally spaced apart upper guide edges 278 and 282 connected to the respective upper edges of sides 264 and 268 and extending generally inwardly towards each other. Cartridge 14 is received by cartridge carrier 154 through a cartridge load opening 290 defined by bottom portion 260, sides 264 and 268 and upper guide edges 278 and 282. When fully received by opening 290, cartridge 14 is held securely but releasably within cartridge carrier 154 by a pair of leaf springs indicated as 294 and 298 that are attached to upper guide edges 278 and 282, and bias or urge cartridge 14 downwardly against bottom portion 260, as well as a pair of cartridge retention clips, one of which indicated as 306 is shown in FIG. 5 as being associated with the rearward or trailing end of side 264. As also shown in FIG.

5, cartridge carrier 154 includes a pair of generally semicircular-shaped cam roller mount members laterally spaced apart along the upper edge of each of sides 264 and 268. One pair of such mount members which extend upwardly from the upper edge of side 264 above upper guide edge 278 are shown in FIG. 5, and are indicated as, respectively, forward or leading roller mount member 314 and rearward or trailing roller mount member 318. Forward roller mount member 314 rotatably receives and mounts cam roller 230, while rearward roller mount member 318 receives and mounts cam roller 232.

Figure 6:
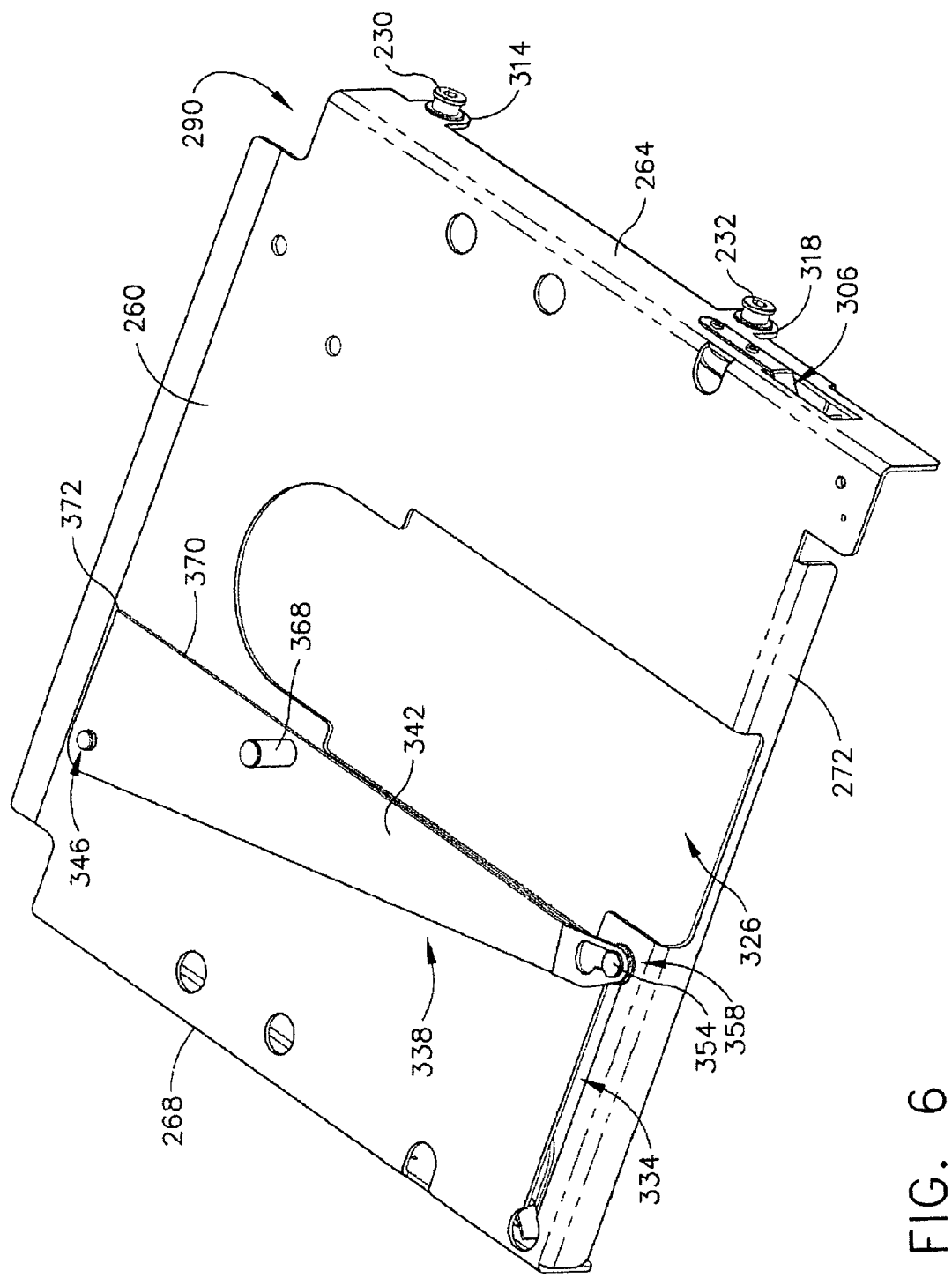
FIG. 6 is a perspective view of the underside of the cartridge carrier of FIG. 5.

Referring to FIGS. 5 and 6, bottom portion 260 of cartridge carrier 154 has formed therein an aperture indicated as 326 that corresponds at least generally in shape and position to the lower disk medium aperture (not shown) on the underside of housing 18 when cartridge 14 is fully loaded within cartridge carrier 154. Bottom portion 260 of cartridge carrier 154 has also formed therein an elongated shutter opening slot indicated as 334 that extends inwardly from side 268 to almost aperture 326, and generally parallel to and proximate rear portion 272. As shown particularly in FIG. 6, cartridge carrier 154 further includes a cartridge shutter opening mechanism indicated generally as 338 on the underside of bottom portion 260 that comprises a generally triangular-shaped main segment 342 that is pivotally attached at one corner 346 nearest side 268 to bottom portion 260 proximate or adjacent to opening 290. Mechanism 338 further includes a cartridge shutter cam slot pin 354 attached at corner 358 of main segment 342 proximate rear portion 272, and extending or protruding upwardly through slot 334. Pin 354 also typically cooperates with a cam slot (not shown) formed in the rearward edge of housing 18 of cartridge 14 to open shutter 22. Mechanism 338 further includes cam sled pin 368 attached to main segment 342 proximate or adjacent edge 370, and positioned between right angle corner 372 of main portion 342 and corner 358 connected by edge 370. Cam sled pin 368 extends or protrudes downwardly from main portion 342 so as to cooperate with a cam slot (not shown) formed in the carrier sled (as described below).

Figure 7:
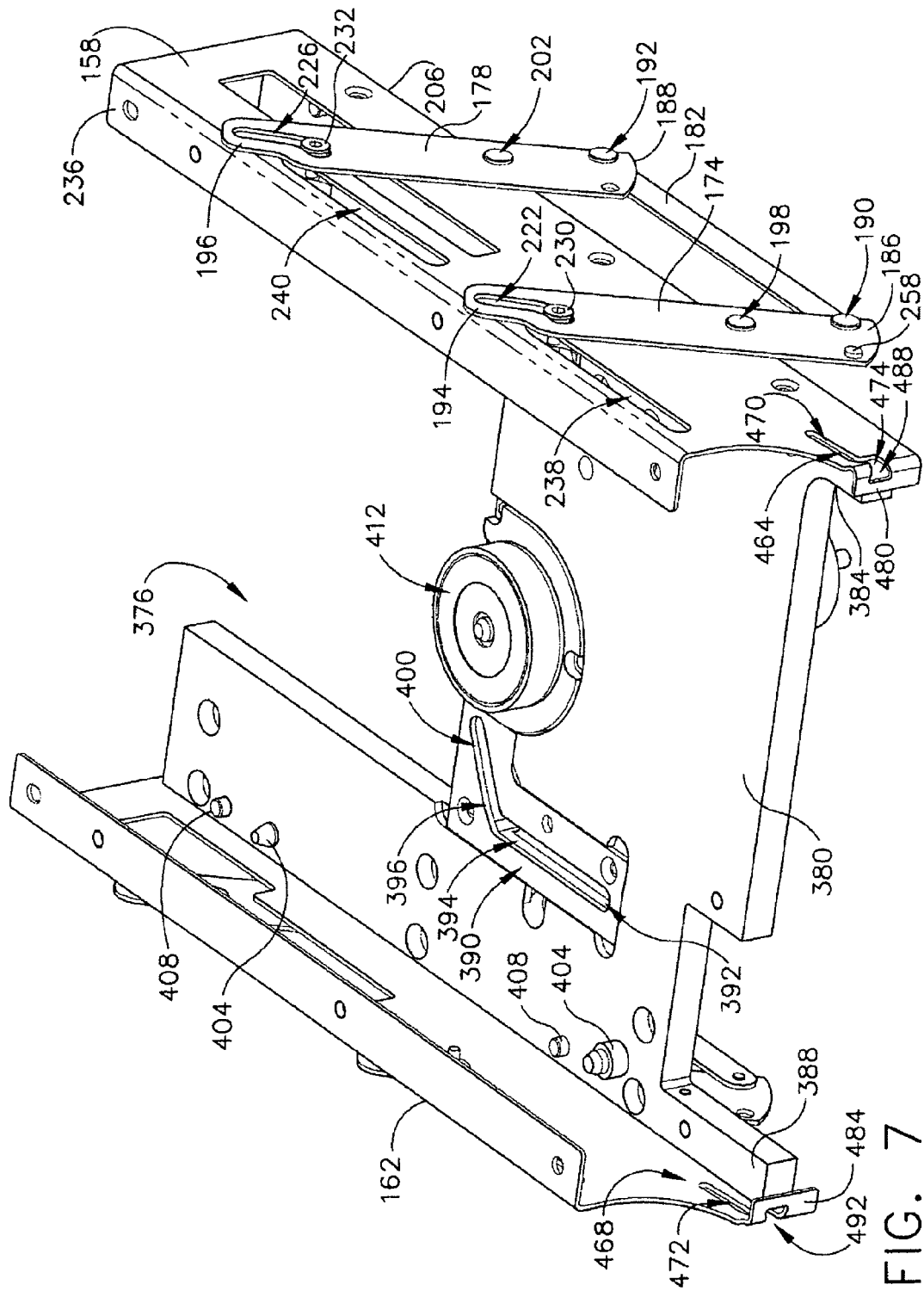
FIG. 7 is a perspective view showing the upper side of an embodiments of the carrier sled and carrier guide assembly of the cartridge loading and unloading mechanism of FIGS. 1 and 2.

Referring to FIG. 7, loader/unloader mechanism 42 further comprises a laterally movable carrier transporter in the form of a carrier sled indicated generally as 376 that includes a carrier sled platform 380. As shown in FIG. 7, cartridge guides 158 and 162 are associated or attached at or proximate the respective bottom edges thereof (e.g., bottom edge 206 of guide 158) to respective side edges 384 and 388 of platform 380. Platform 380 is provided with a generally J-shaped shutter opening cam slot 390. Slot 390 extends initially and from its forward or leading end indicated as 392 generally rearwardly and generally parallel to side edges 384 and 388 as linear slot segment 394. At the rearward end of linear slot segment 394, slot 390 slants inwardly as slot segment 396 to the end of slot 390 indicated as 400 at or proximate the center of platform 380. Slot 390 receives cam sled pin 368 of cartridge shutter opening mechanism 338 (as describe below). As shown in FIG. 7, platform 380 can be provided with one or more (typically a plurality of) cartridge locating pins, two of which are indicated as 404, for locating cartridge 14 in the vertical (down) position, as well as one or more (typically a plurality of) magnets, two of which are indicated as 408, for accurately locating cartridge carrier 154 in the vertical (down) position. A data cartridge coupler in the form of data cartridge drive spindle 412 for coupling with cartridge 14, and engaging and rotating the disk medium 30 of cartridge 14 is positioned and mounted or otherwise attached at or proximate the center of platform 380, as well as being proximate the rearward end 400 of slot 390.

Figure 8:
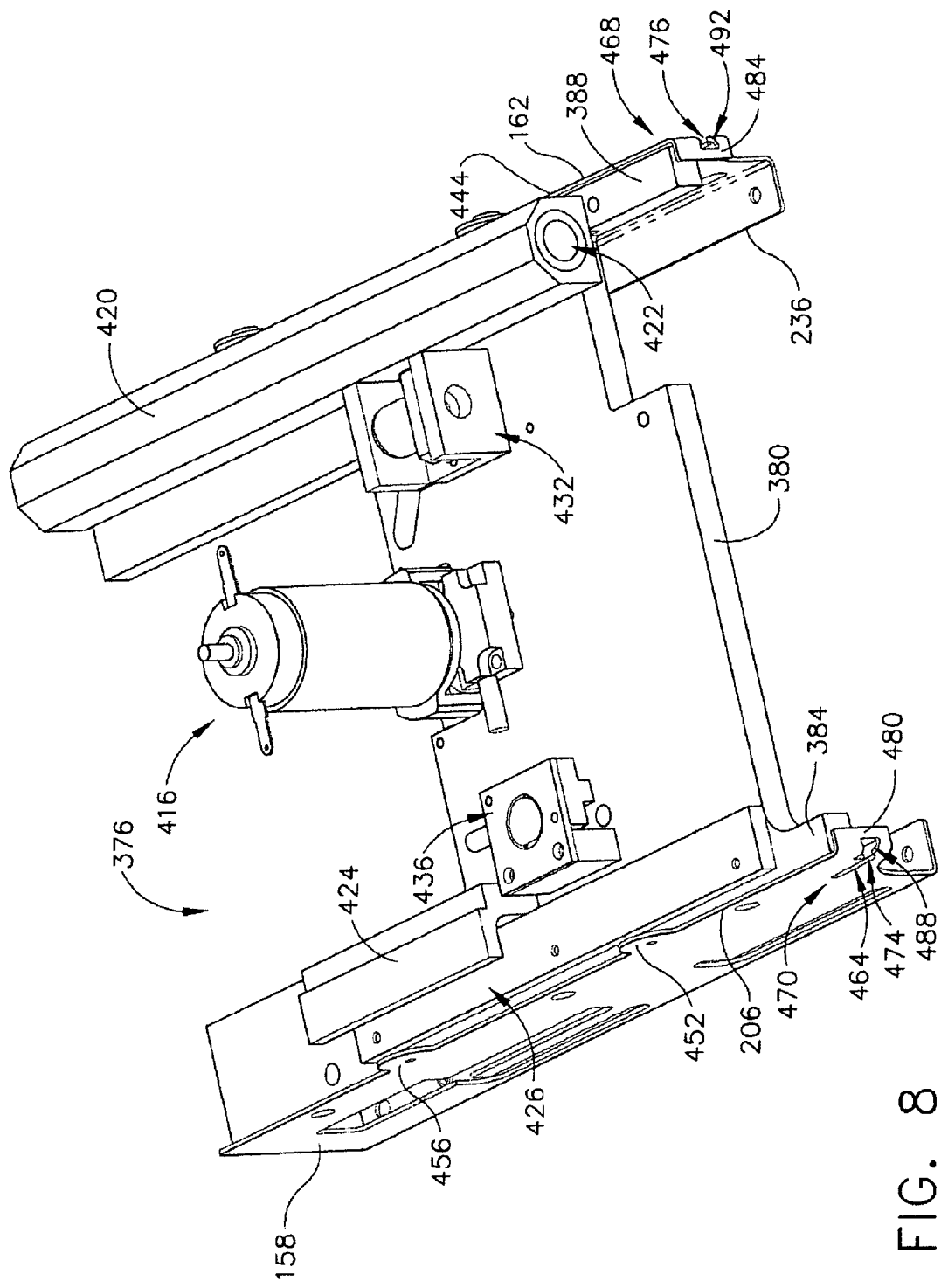
FIG. 8 is a perspective view showing the underside of the carrier sled and carrier guide assembly of FIG. 7.

Referring to FIG. 8, spindle 412 is actuated, rotated or otherwise driven by a spindle motor assembly indicated generally as 416 that is mounted on or otherwise attached to the underside of platform 380. An elongated sled bushing 420 is provided that is mounted on or otherwise attached to the underside of platform 380 and extends generally parallel and proximate to edge 388. Sled bushing 420 receives sled guide 118 within generally cylindrical bore 422 to guide the lateral movement of sled carrier 376 forwards and/or backwards. An anti-rotational bushing 424 is also provided that is mounted on or otherwise attached to the underside of platform 380 and extends generally parallel and proximate to edge 384. Bushing 424 is associated with sled guide 114 and has formed therein a sled guide slot 426 that is shown as opening outwardly toward edge 384 of platform 380. Sled guide slot 426 slidably receives sled guide 114 and keeps sled carrier 376 from rotating during lateral movement thereof forwards and/or backwards. (The arrangement of bushing 420/guide 118 and bushing 424/guide 114 can also be reversed.) A transfer movement responsive member in the form of lead screw nut 432 is also mounted on, attached to or otherwise associated with the underside of platform 380 adjacent to sled bushing 420. Lead screw nut 432 receives lead screw 134 and causes or imparts lateral movement to carrier sled 376 forwards and/or backwards in response to the rotation or movement of lead screw 134. A sensor 436 is also mounted on or otherwise attached to the underside of platform 380 proximate the forward end of bushing 424 and adjacent to edge 384. Sensor 436 detects the lateral positioning of sled carrier 376 relative to base plate 82 by sensing the relative position of the sensing portion 144 of linear encoder 140 as sled carrier 376 moves forwards and/or backwards.

As shown in FIG. 8, the respective bottom edges 206 and 444 of carrier guides 158 and 162 are each provided with a pair of generally semicircular-shaped cam carrier mounting members that are laterally spaced apart along the respective bottom edges 206 and 444. As shown in FIG. 8., the pair of cam carrier mounting members provided for carrier guide 158 comprises a forward or leading cam carrier mounting member 452 and a rearward or trailing cam carrier mounting member 456; a similar pair of mounting members is provided for carrier guide 162 along bottom edge 444. Forward mounting member 452 pivotally mounts forward carrier cam 174 on carrier guide 158 using pivot pin 198, while mounting member 456 pivotally mounts rearward carrier cam 178 on carrier 158 using pin 202.

As shown in FIGS. 3, 7 and 8, carrier guides 158 and 162 each have a generally J-shaped or L-shaped drive door cam slot indicated as 464 or 468 at the forward end thereof, and proximate or adjacent to respective bottom edges 206 or 444. Drive door cam slots 464 and 468 each have generally linear slot segments 470 or 472 extending generally parallel relative to respective bottom edges 206 or 444, and connecting with respective shorter curved slot segments 474 and 476. Curved slot segments 474 and 476 extend generally downward and towards respective bottom edges 206 or 444, and intersect lower front end portions 480 and 484 of carrier guides 158 and 162 at respective slot access openings 488 and 492. Slot access openings 488 and 492 each receive respective drive door cam actuating pins at the lower corners 100 and 102 of door cams 60 and 62 (as described below) when carrier sled 376 laterally moves forward or towards drive door assembly 38 to the unloading or ejecting position for mechanism 42.

Figure 9:
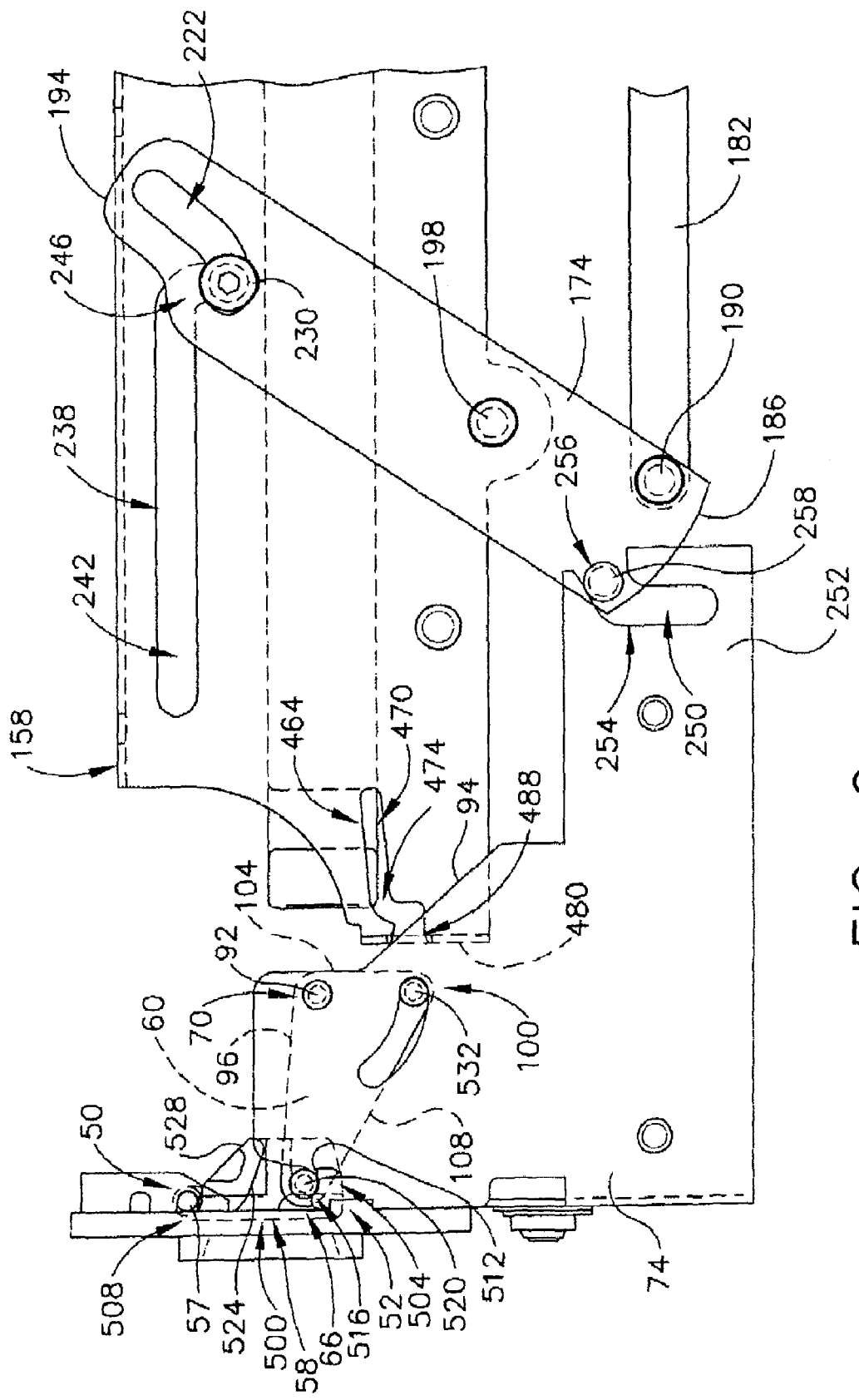
FIG. 9 is a side view showing an embodiment of the drive door mechanism of the present invention.

Referring to FIG. 9 which shows the components that cooperate in the operation of the drive door mechanism (e.g., the components of drive door assembly 38, drive door cam 60, etc.), cam profile 58 is shown as being formed in and protruding from one end 500 of drive door 48. Cam profile 58 comprises a generally L-shaped locking member indicated as 504 and a generally J-shaped cam member indicated as 508. Locking member 504 is shown in FIG. 9 as being positioned at the lower forward corner of drive door end 500 and includes a generally L-shaped inner surface 512 having a locking portion in the form of a notch indicated as 516 that receives drive door actuating cam pin 520 that extends inwardly from forward corner 66 of drive door cam 60. Cam member 508 includes a curved outer cam surface indicated as 524 that extends from proximate upper edge 50 of drive door 48 to the upper rearward portion of drive door end 500 as indicated by 528. In operation, cam surface 524 is engaged by and cooperates with cam pin 520. As also shown in FIG. 9, a drive door cam actuating pin indicated as 532 extends inwardly from lower rear corner 100 of drive door cam 60. In operation, actuating pin 532 is received by slot access opening 488 and thus engages drive door cam slot 464.

In operation and starting from the loaded position (see FIG. 1), to unload or eject cartridge 14 from loader/unloader mechanism 42, motor and gear drive assembly 130 is activated to rotate lead screw 134 such that screw 134 causes or imparts lateral movement to lead screw nut 432 forwardly and towards drive door assembly 38. As lead screw nut 432 moves forwardly towards drive door assembly 38, carrier sled 376, which is slidably mounted by bushings 420 and 424 on respective sled guides 118 and 114 for lateral movement, moves forwardly, along with associated carrier guides 158 and 162. As carrier guides 158 and 162 move forwardly, cam rollers 230 and 232 are engaged by transverse slot segments 246 and 248 of cam slots 238 and 240, thus causing cartridge carrier 154 to also move forwardly with loaded cartridge 14.

As carrier sled 376 continues to move forwardly, carrier cam pin 258 of forward carrier cam 174 eventually enters carrier cam slot 250 (through slot access opening 256) and engages the curved portion 254 of slot 250. As a result, the upper end 194 of forward carrier cam 174 begins to pivot or swing forwardly (i.e., counterclockwise) about the axis defined by pivot pin 198, with the upper end 196 of rearward carrier cam 178 also synchronously or simultaneously pivoting or swinging forwardly about the axis defined by pivot pin 202 in response to the generally rearward movement of linking member 182 connecting respective lower ends 186 and 188. This forward pivoting movement of upper end 194 and 196 of carrier cams 174 and 178 (due to the engagement of carrier cam pin 258 within the curved portion 254 of slot 250) also causes cam rollers 230 and 232 to move upwardly and out of transversely extending shorter slot segments 246 and 248 of the respective carrier cam slots 238 and 240, and then forwardly within the respective longitudinal slot segments 242 and 244 (see FIGS. 10-14). As a result of the forward movement of cam rollers 230 and 232 into and within longitudinal slot segments 242 and 244, cartridge carrier 154 moves upwardly and then forwardly and away from platform 380 such that cartridge 14 is no longer coupled with drive spindle 412. As the upper ends 194 and 196 of carrier cams 174 and 178 continue to pivot or swing forwardly, cam rollers 230 and 232 eventually engage the forward end of longitudinal slot segments 242 and 244 (see FIG. 15).

As cartridge carrier 154 continues to move forwardly, cam sled pin 368 within shutter opening cam slot 390 moves from rearward end 400 of slot 390 forwardly and outwardly along slanted segment 396, and then forwardly within linear segment 394 towards the forward end 392 of slot 390. As a result of the outward movement of cam sled pin 368 within slanted segment 396 of slot 390, cartridge shutter opening mechanism 338 is actuated such that cartridge shutter cam slot pin 354 moves within shutter opening slot 334 towards side 268 and away from side 264 of cartridge carrier 154. As cartridge shutter cam slot pin 354 moves within shutter opening slot 334 towards side 268 and away from side 264, pin 354 eventually stops moving, as defined by cam sled pin 368 moving along slanted segment 396 of slot 390 to fully close shutter 22 of cartridge housing 18, so that the disk medium 30 of cartridge 14 is no longer exposed.

As carrier sled 376 moves forward, carrier cam pin 258 enters and moves within the curved portion of 254 of slot 250, thus causing cartridge carrier 154 to first move upwardly (due to cam rollers 230 and 232 moving upwardly and out of transverse slot segments 246 and 248). With the further forward movement of carrier sled 376, cam sled pin 368 moves within slanted segment 396 of slot 390, thus causing shutter 22 to close, as previously described. At about the same time, carrier guides 158 and 162, which are moving forwardly with associated platform 380 of carrier sled 376, cause respective drive door cam slots 464 and 468 at the lower forward ends 480 and 484 of guides 158 and 162 to receive (through respective slot access openings 488 and 492) the drive door cam actuating pins (e.g., actuating pin 532) at respective lower rear corners 100 and 102 of door cams 60 and 62 (see FIGS. 9-10).

Figure 10:
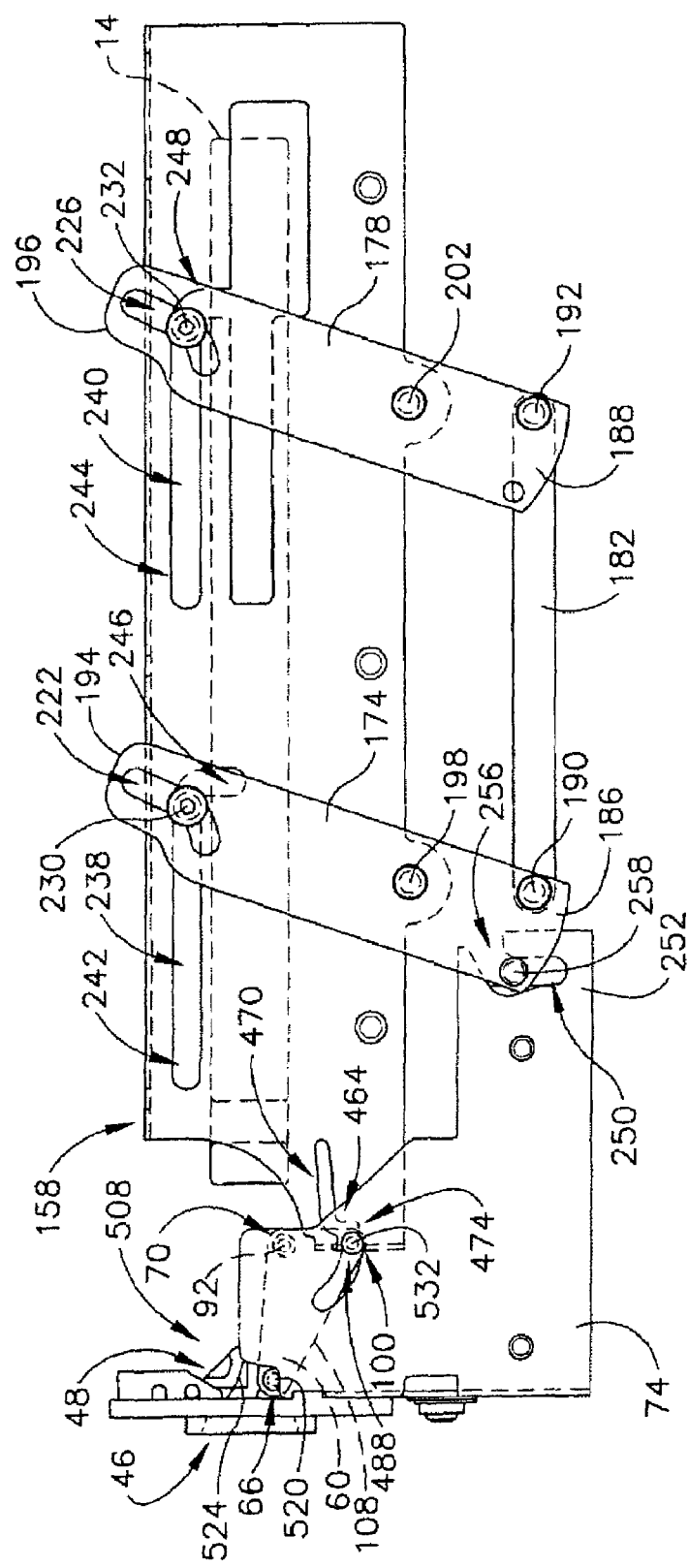
FIGS. 10 through 15 are side views illustrating the sequential operation of the drive door mechanism of FIG. 9, as well as the cartridge unloading and loading mechanism of FIGS. 1-2, starting from a cartridge loaded position and ending with a cartridge unloaded or ejected position.
Figure 11:
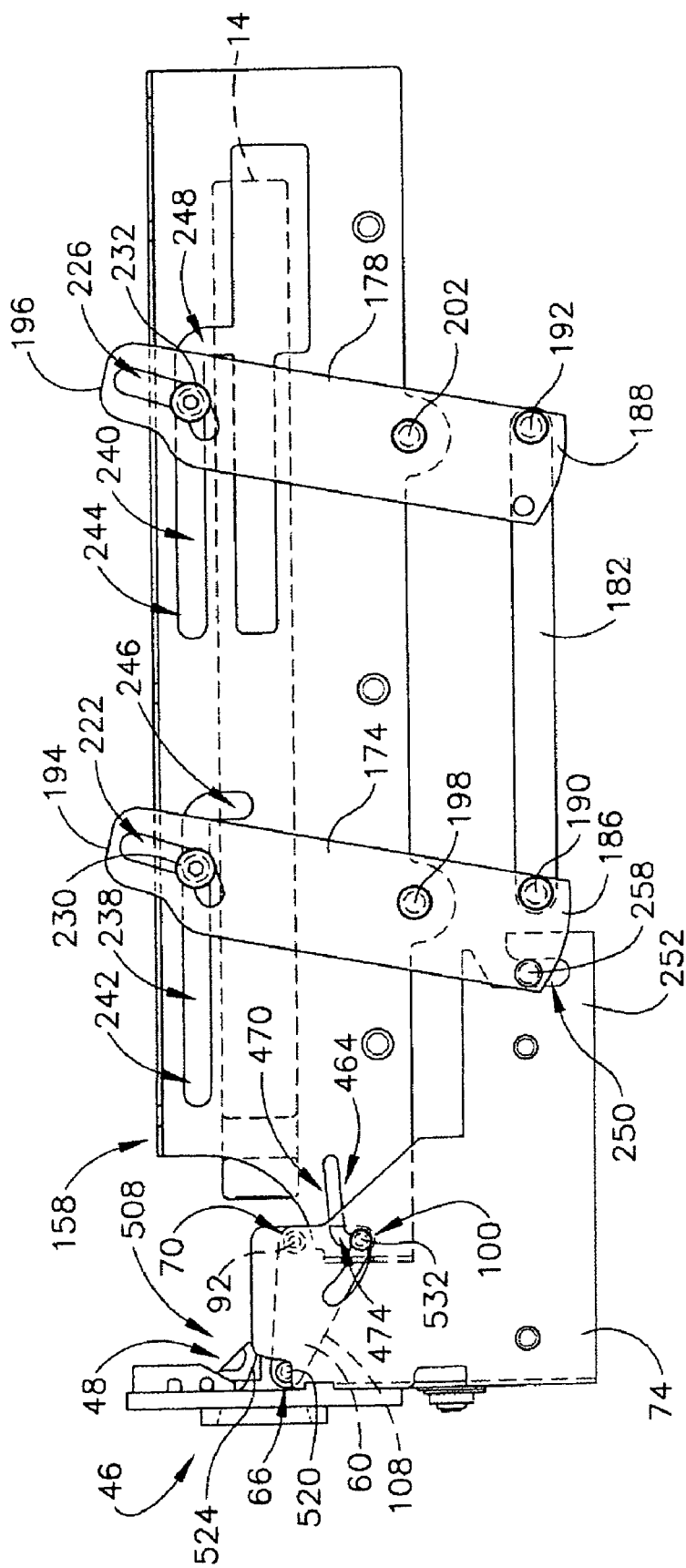
Figure 12:
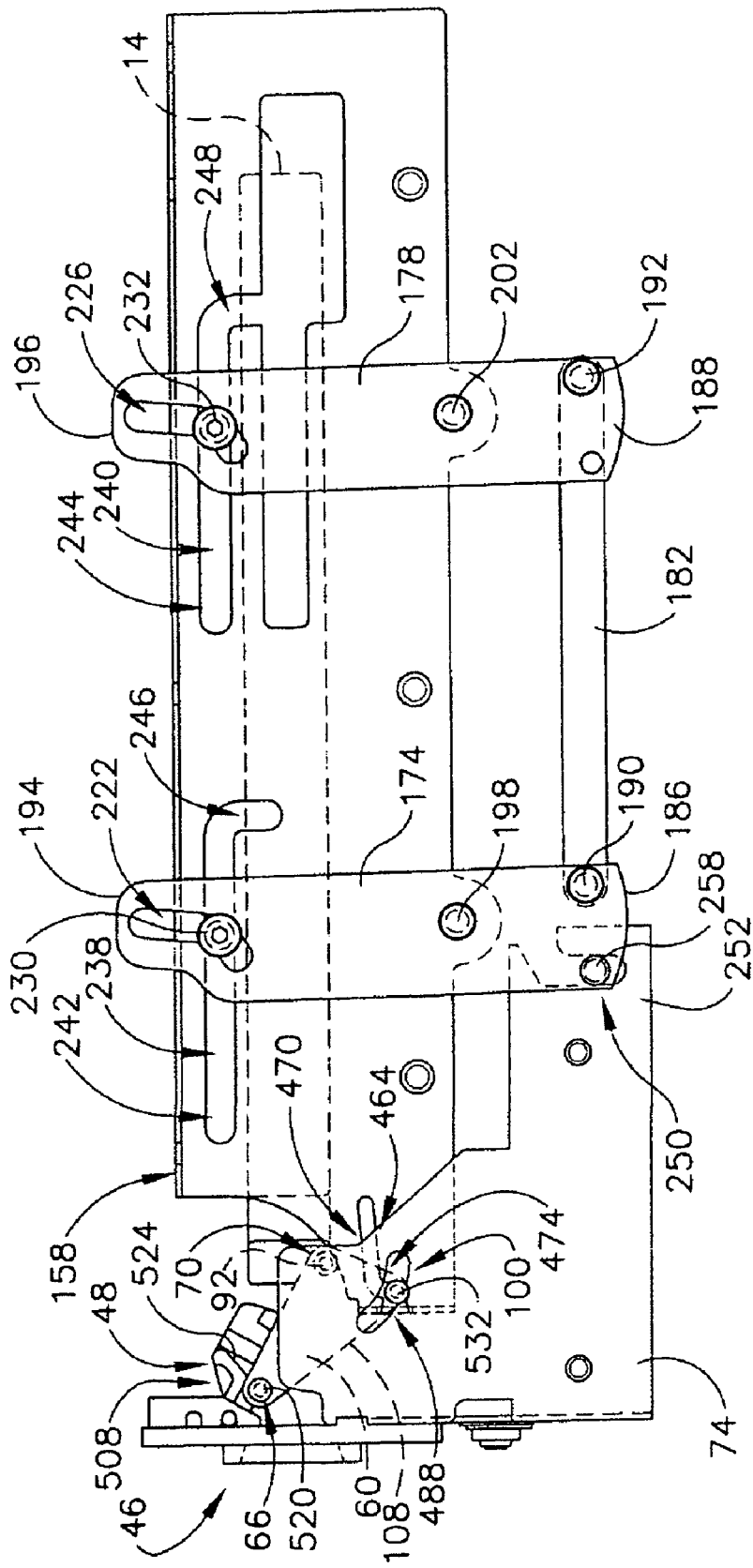

As shown in FIGS. 10-11, drive door cam actuating pin 532 engages the shorter curved slot segment 474 of drive door cam slot 464. As a result, forward corner 66 of door cam 60 moves upwardly as door cam 60 pivots about the axis defined by right angle corner 70. As a result, drive door actuating cam pin 520 at forward corner 66 moves out of locking notch 516 of locking member 504 and against the outer cam surface 524 of cam member 508, as shown in FIG. 12, such that drive door 48 is biased or urged to begin to pivot or swing upwardly and away from load port 46 about the axis defined by the pivot pins (e.g., pin 57) mounting drive door 48 on bezel 44 into a partially opened position. At this point in the operation of cartridge loader/unloader mechanism 42, although load port 46 is now partially uncovered, shutter 22 of cartridge 14 is in a closed position such that disk medium 30 is not exposed.

Figure 13:
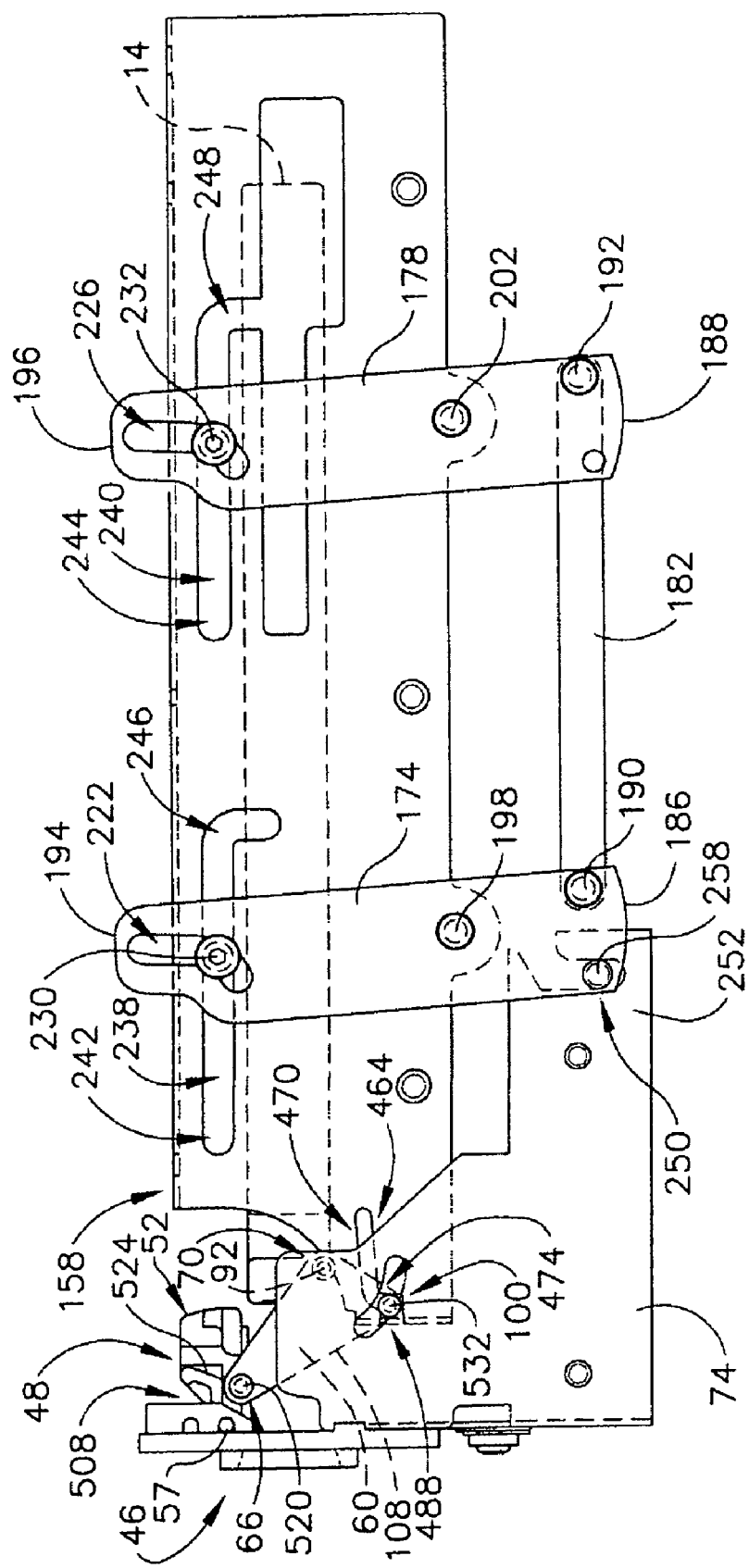
Figure 14:
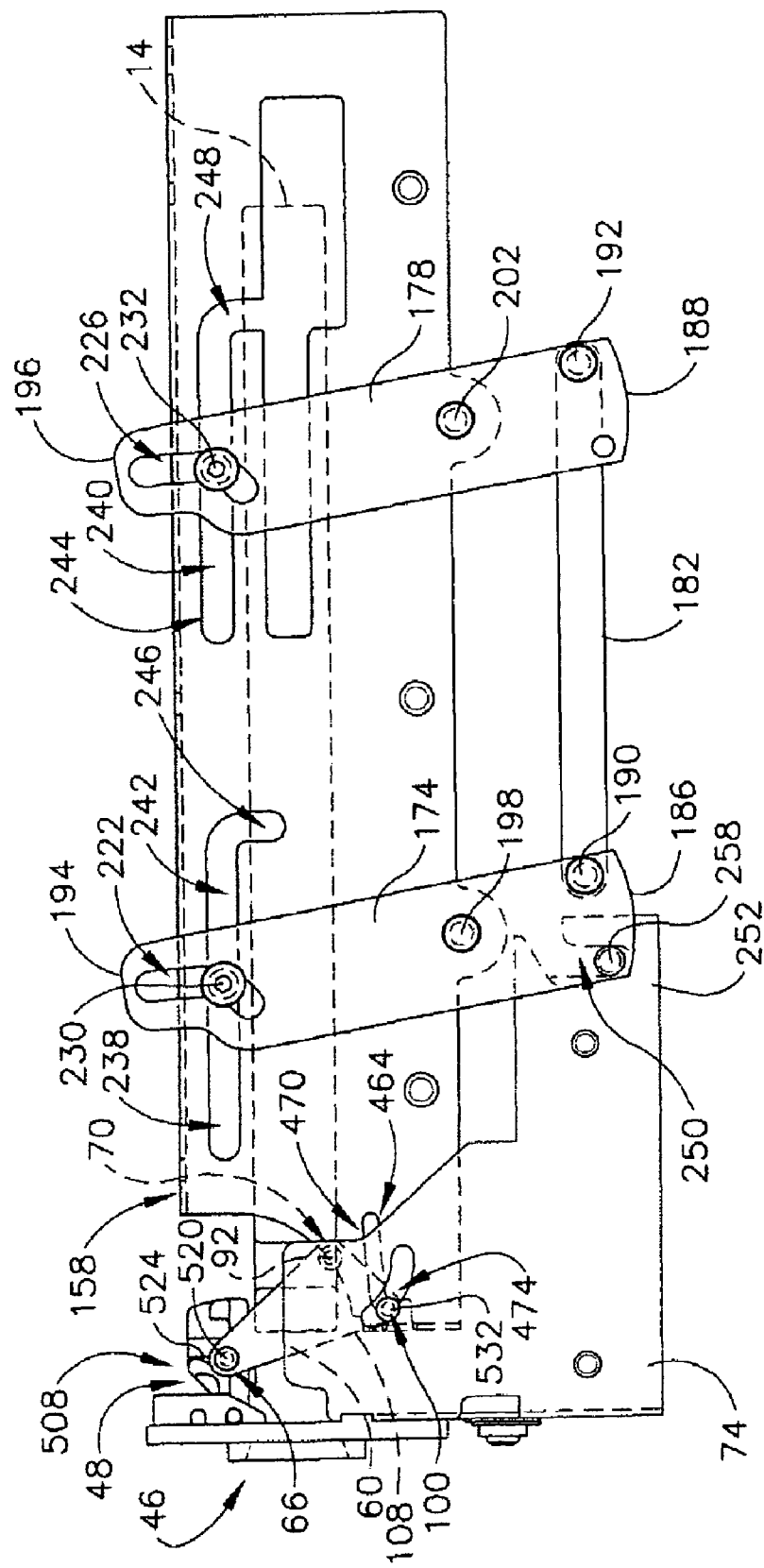
Figure 15:
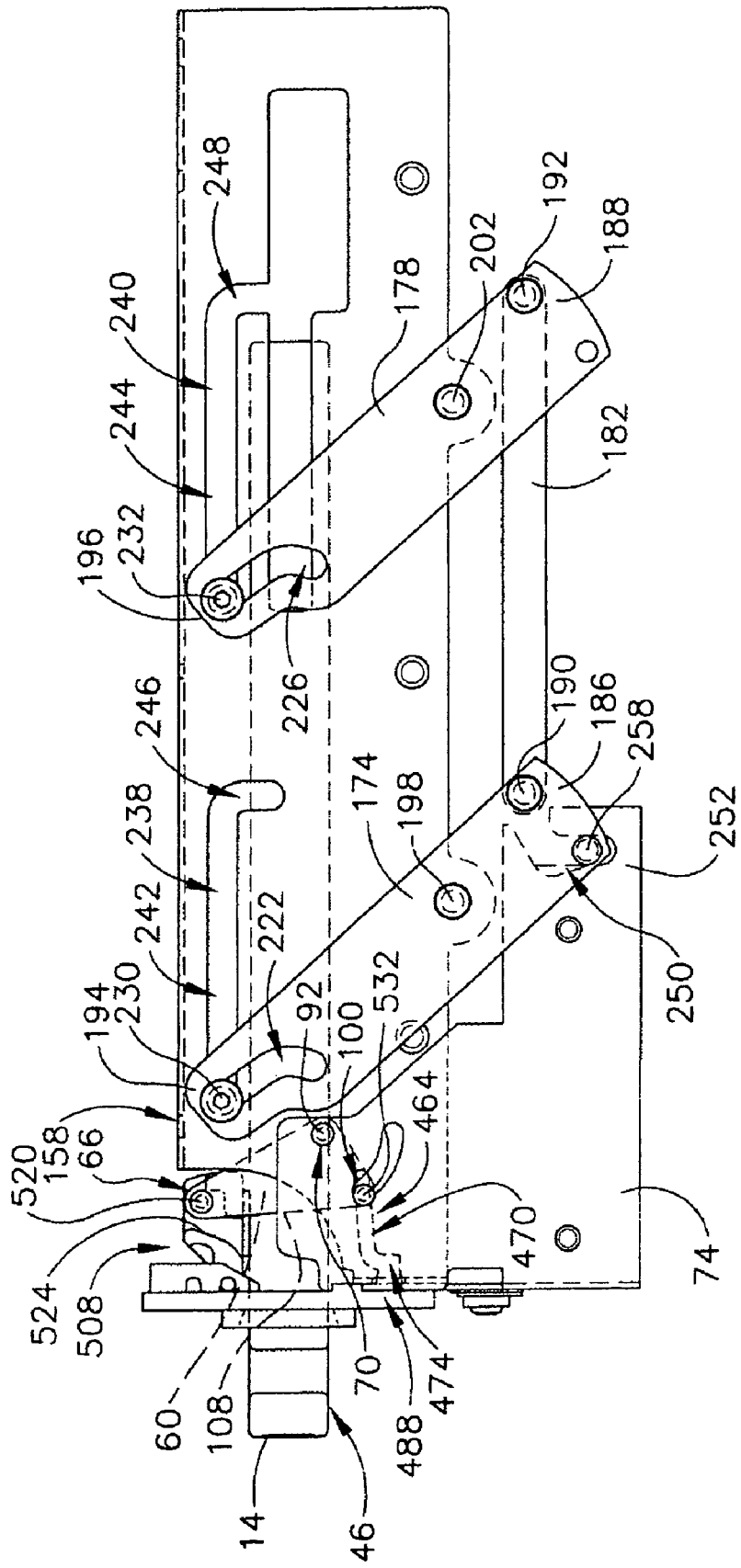

As carrier guides 158 and 162 continue to move forwardly and as shown FIG. 13, forward corner 66 of door cam 60 continues to move upwardly, thus causing drive door actuating cam pin 520 to continue to be urged against and rearwardly along cam surface 524 towards upper rearward portion 528 such that drive door 48 reaches a fully opened position (i.e., when lower edge 108 of door cam 60 is perpendicular or approaches perpendicular relative to base plate 82). As shown in FIG. 14, cartridge 14, which is moving forward along with cartridge carrier 154, slides underneath fully opened drive door 48 and thus supports drive door 48 in this fully opened position. As shown in FIG. 15, as cartridge 14 continues to move forward with carrier 154, the forward end of cartridge 14 moves through load port 46 such that such that cartridge 14 has reached the unloaded or ejected position (as shown in FIG. 2), and can now be retrieved by the user from data drive 10.

To load cartridge 14, a similar reciprocal but reverse operation to unloading/ejecting cartridge 14 is carried out by data drive 10 (see FIGS. 1-2 and 10-15 in reverse order), starting with and similar to the unloading/ejecting position shown in FIG. 2. Cartridge 14 to be loaded is inserted through load port 46 (similar to what is shown in FIG. 2) causing drive door 48 to pivot upwardly and away from load port 46 about the axis defined by the pivot pins (e.g., pin 57) mounting door 48 on bezel 44. The inserted cartridge 14 is then received through the load opening 290 of cartridge carrier 154 and held securely therein by leaf springs 294 and 298, as well as by cartridge retention clips (such as 306) when fully inserted within carrier 154. The cartridge shutter cam slot pin 354 also engages a slot (not shown) formed in housing 18 of cartridge 14 for opening shutter 22 (as describe below). A sensor (not shown) is typically provided that, for example, can be mounted on the rearward end of bottom portion 260 adjacent side 264 to detect when cartridge 14 has been fully inserted within the carrier 154.

When cartridge 14 is detected as being fully inserted within cartridge carrier 154, motor and gear drive assembly 130 is then activated to cause rotation of lead screw 134 such that it causes or imparts movement to lead screw nut 432 rearwardly and away from drive door assembly 38. As lead screw nut 432 moves rearwardly away from drive door assembly 38, carrier sled 376 moves rearwardly on sled guides 114 and 118, along with associated carrier guides 158 and 162. As carrier sled 376 with associated carrier guide 158 (and 162) move rearwardly, the upper end 194 of carrier cam 174 begins to pivot or swing rearwardly (i.e., clockwise) about the axis defined by pivot pin 198 and in response to carrier cam pin 258 engaging curved portion 254 of carrier cam slot 250. As upper end 194 of carrier cam 174 swings rearwardly, upper end 196 of carrier cam 178 also swings rearwardly simultaneously or synchronously about the axis defined by pivot pin 202 and in response to the forward movement of linking member 182 connecting respective lower ends 186 and 188.

As carrier sled 376 continues to move rearwardly, along with associated carrier guide 158 (and 162), and as respective upper ends 194 and 196 of carrier cams 174 and 178 continue to swing rearwardly, cam roller slots 222 and 226 interact with and engage respective cam rollers 230 and 232, thus causing cartridge carrier 154 to also move rearwardly as cam rollers 230 and 232 move rearwardly within the longitudinal slot segments 242 and 244 of cartridge cam slots 238 and 240 of carrier guide 158, along with cartridge 14 which is underneath and supporting drive door 48 in the opened position. When the forward end of cartridge 14 fully clears the lower edge 52 of drive door 48, drive door 48 is no longer supported in an opened position by cartridge 14, but is instead supported by the outer curved cam surface 524 (of cam member 508 on drive door 48) resting on drive door actuating cam pin 520 of drive door cam 60, as well as the engagement of drive door cam actuating pin 532 (at corner 100 of door cam 60) by shorter curved slot segment 474 of drive door cam slot 464. As a result, drive door 48, which is typically urged or biased downwardly by, for example, a torsion spring (not shown), continues to pivot downwardly into a closed position so as to cover load port 46, as defined by the position of pin 520 on drive door cam 60, as shown, for example, in FIGS. 10-11.

As shown in FIG. 10, when door cam 60 pivots completely down (e.g., when upper edge 96 of door cam 60 is substantially parallel to base plate 82 and rearward edge 104 of door cam is substantially perpendicular to base plate 82), drive door actuating cam pin 520 at forward corner 66 engages locking notch 516 of locking member 504 such that drive door 48 is in a locked position, and thus cannot be accidentally opened while shutter 22 of cartridge 14 is open and disk medium 30 exposed. Eventually, the drive door cam actuating pins (e.g., actuating pin 532) at respective lower rear corners of 100 and 102 exit respective drive door cam slots 464 and 468 (through respective slot access openings 488 and 492) as carrier guides 158 and 162 continue to move rearwardly in response to the movement of carrier sled 376. During the rearward movement of carrier sled 376 and until drive door 48 is locked by cam pin 520 (i.e., at corner 66 of door cam 60) within locking notch 516 (of locking member 504), cam sled pin 368 of cartridge shutter opening mechanism 338 moves away from front end 392 of shutter opening cam slot 390 within linear segment 394. While cam sled pin 368 is moving within linear segment 394 and away from front end 392, cartridge shutter cam slot pin 354 does not move relative to the cartridge carrier 154, but remains engaged with the slot (not shown) formed in housing 18 of cartridge 14 such that shutter 22 of cartridge 14 remains closed.

When drive door 48 is locked, further rearward movement of carrier sled 376 causes cam sled pin 368 of cartridge shutter opening mechanism 338 to move within the slanted portion 396 of slot 390 towards end 400. In response to the movement of cam sled pin 368 within the slanted portion 396 towards end 400, cartridge shutter opening mechanism 338 rotates cartridge shutter cam slot pin 354 as pin 354 moves within shutter opening slot 334 of cartridge carrier 154 from side 268 of cartridge carrier 154 towards the aperture 326 of carrier 154 to open shutter 22 of cartridge 14.

During the opening of the shutter 22, cam rollers 230 and 232 remain within the longitudinal slot segments 242 and 244 of cam slots 238 and 240. With further rearward movement of carrier sled 376, along with the opening of shutter 22 to expose circular disk medium 30, rollers 230 and 232 eventually reach respective transverse slot segments 246 and 248. As a result, cam rollers 230 and 232 move into and downwardly within transverse slot segments 246 and 248, thus causing cartridge carrier 154 to move downwardly and towards platform 380 of carrier sled 376 until cartridge 14 is coupled with drive spindle 412. During the downward movement of rollers 230 and 232 within transverse slot segments 246 and 248, carrier cam pin 258 of carrier cam 174 is within the curved portion 254 of carrier cam slot 250. This represents cartridge 14 being in a loaded position, as shown in FIG. 1. At this point, carrier cam pin 258 is able to exit slot 250 through opening 256. Once cartridge 14 is in a loaded position, carrier sled 376 can continue to move rearwardly (i.e., by further rotation of lead screw 134 under the action of drive assembly 130 that causes lead screw nut 432 to move further rearwardly) until cartridge 14 is in the appropriate position for reading/writing of data from or to disk medium 30 by a read/write head (not shown) of data drive 10.

It should be appreciated that the specific embodiment of the loader/unloader mechanism 42, and associated components of data drive 10, illustrated in FIGS. 1 through 15 are provided to illustrate the teachings of the present invention. Alterations or modification within the skill of the art of the specific embodiment of the loader/unloader mechanism 42, and associated components of data drive 10, illustrated in FIGS. 1 through 15 are considered within the scope of the present invention, so long as these alterations or modifications operate in a same or similar manner, function, etc. These modifications can include the use of a single element, component or mechanism (in place of a plurality of elements, components or mechanisms shown in the FIGs.), such as one of door cams 60 and 62 (including associated elements or components thereof), one locking member 504, one cam member 508, etc., the use of a plurality of elements, components or mechanisms (in place of a single of element, component or mechanism is shown in the FIGs.), the changing of the order, orientation, position, etc., of any of the elements, components or mechanisms, the combining or integrating of any of the elements, components or mechanisms into a single or unified element, component or mechanism, or the ungrouping of an element, component or mechanism into a plurality of associated elements, components or mechanisms, etc. Carrier sled 376 with loaded cartridge 14 can be moved rearwardly in data drive 10 (i.e., by further rotation of lead screw 134 under the action of drive assembly 130 that causes lead screw nut 432 to move further rearwardly) to an appropriate position for reading/writing of data from or to disk medium 30 by a read/write head that is in a relatively fixed or stationary position, or alternatively sled 376 with loaded cartridge 14 can be moved so as to cooperate with a moveable read/write head for reading/writing of data from or to disk medium 30.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device comprising:
 a data storage cartridge loading and unloading mechanism having a cartridge carrier for releasably receiving a data cartridge and for moving the data cartridge towards or away from a data cartridge coupler and for moving the data cartridge laterally between cartridge loaded and unloaded positions;
 wherein the cartridge carrier moves the data cartridge towards or away from the data cartridge coupler and moves the data cartridge laterally between cartridge loaded and unloaded positions in response to the lateral movement of a carrier transporter,
 wherein the carrier transporter has the data cartridge coupler associated therewith and is movable laterally between the cartridge loaded and unloaded positions,
 wherein the loading and unloading mechanism further comprises:
 at least one carrier guide associated with the carrier transporter for receiving the cartridge carrier and having:
 at least one cartridge carrier cam slot; and
 cam means for engaging and actuating a drive door cam between drive door closed and opened positions;
 a carrier cam assembly associated with the at least one carrier guide for causing the cartridge carrier to move towards or away from the data cartridge coupler;
 wherein the cartridge carrier has cam means extending through and movable within the at least one cartridge carrier cam slot and engaging the carrier cam assembly so that the carrier cam assembly can move the cartridge carrier towards or away from the data cartridge coupler;
 wherein when the loading and unloading mechanism moves towards the unloading position:
 the at least one cartridge carrier cam slot engages the cartridge carrier cam means so that the cartridge carrier moves towards the cartridge unloading position;
 the carrier cam assembly causes the cartridge carrier to move away from the data cartridge coupler and to an uncoupled position; and
 the carrier guide cam means engages and actuates the drive door cam to a drive door opened position;
 wherein when the loading and unloading mechanism moves towards a loading position:
 the at least one cartridge carrier cam slot engages the cartridge carrier cam means so as to cause the cartridge carrier to move towards the cartridge loading position;
 the carrier cam assembly causes the cartridge carrier to move toward the data cartridge coupler and to a coupled position; and
 the carrier guide cam means engages and actuates the drive door cam to a drive door to a closed position.

2. The device of claim 1, wherein the at least one carrier cam slot has a generally L-shaped configuration and comprises a forward longitudinal cam slot segment extending along the longitudinal axis of the carrier guide and having a trailing end, and a rearward transverse cam slot segment extending transversely from the trailing end of the longitudinal cam slot segment, and wherein the movement of the carrier guide cam means into or out of the transverse segment causes the cartridge carrier to move the data cartridge towards or away from the data cartridge coupler.

3. The device of claim 2, wherein the cartridge carrier cam means comprises a pair of cam rollers rotatably mounted by the cartridge carrier, wherein the at least one cartridge carrier cam slot comprises a pair of laterally spaced apart cartridge carrier cam slots, each cam roller extending through one of the cartridge carrier cam slots, wherein the carrier cam assembly comprises a pair of laterally spaced apart and elongated carrier cams each having first and second ends, the first ends of the carrier cams pivotally connected by a linking member and the second ends of each carrier cam having a cam roller slot for receiving one of the cam rollers for movement therein, and wherein each of the carrier cams is pivotally mounted between the respective first and second ends thereof on the at least one carrier guide such that the second ends of the carrier cams can pivot synchronously in response to movement of the cam rollers within the cartridge carrier cam slots.

4. The device of claim 3, wherein the first ends are lower ends of the carrier cams and wherein the second ends are upper ends of the carrier cams, wherein one of the carrier cams is the leading carrier cam and wherein the other carrier cam is the trailing carrier cam, and wherein the leading carrier cam comprises means for causing the upper ends of the carrier cams to pivot forwardly when the carrier transporter moves laterally forward and to pivot rearwardly when the carrier transporter moves laterally rearward.

5. The device of claim 4, wherein the means for causing the upper ends of the carrier cams to pivot forwardly or rearwardly comprises a carrier cam member that is receivable by and engages a carrier cam slot when received thereby.

6. The device of claim 3, wherein the at least one carrier guide comprises a pair of laterally and generally parallel spaced apart carrier guides each having an interior and exterior and associated with the carrier transporter and receiving the cartridge carrier between the interiors of the carrier guides, and wherein each carrier guide has a carrier cam assembly associated with the exterior thereof.

7. The device of claim 1, wherein the carrier guide cam means comprises a drive door cam slot for receiving and engaging a drive door cam actuating member associated with the drive door cam.

8. The device of claim 7, wherein the drive door cam slot is generally J-shaped and has a curved slot segment extending generally downward towards a slot access opening for receiving the drive door cam actuating member.

9. The device of claim 1, wherein the cartridge carrier comprises a cartridge shutter opening mechanism having cartridge shutter cam pin for cooperating with a cam slot formed in the data cartridge.

10. The device of claim 9, wherein the cartridge carrier comprises a bottom portion having an elongated shutter opening slot formed therein, wherein the cartridge shutter opening mechanism is attached to the underside of the bottom portion, and wherein the cartridge shutter cam pin extends upwardly through the shutter opening slot.

11. The device of claim 10, wherein the cartridge shutter opening mechanism is pivotally attached to the underside of the bottom portion and wherein the cam shutter cam pin is movable within the shutter opening slot in response to pivotal movement of the cartridge shutter opening mechanism.

12. The device of claim 9, wherein the cartridge shutter opening mechanism further comprises a cam sled pin and wherein the carrier transporter has a shutter opening cam slot for receiving the cam sled pin.

13. The device of claim 12, wherein the carrier transporter comprises a carrier sled having a carrier sled platform and wherein the shutter opening cam slot is formed in the carrier sled platform.

14. The device of claim 13, wherein the shutter opening cam slot is generally J-shaped and has a leading end, a linear slot segment extending from the leading end, and a slanted slot segment extending from the linear slot segment.

15. The device of claim 14, wherein the carrier sled platform has a center, wherein the slanted slot segment extends to proximate the center of the carrier sled platform, and wherein the data cartridge coupler comprises a data cartridge drive spindle mounted proximate the center of the carrier sled platform.

16. A data storage cartridge loading and unloading mechanism for a data drive comprising a drive door assembly having a drive door movable between closed and opened positions, a data cartridge coupler associated with the loading and unloading mechanism, a pair of spaced apart carrier cam slots, and a pair of door cams each having a cam pin for causing the drive door to move between the closed and opened positions, the loading and unloading mechanism comprising:
  a cartridge carrier for releasably receiving the data cartridge and for moving the data cartridge towards or away from the data cartridge coupler, and having a pair of spaced apart sides, each side rotatably mounting a pair of laterally spaced apart cam rollers;
  a pair of laterally spaced apart carrier guides each having an interior and exterior for receiving the cartridge carrier therebetween, each carrier guide further having:
    a pair of laterally spaced cartridge carrier cam slots aligned along the same longitudinal axis; and
    a drive door cam slot for receiving a drive door cam actuating member of one of the drive door cams and for actuating the drive door cam;
  a pair of carrier cam assemblies, each carrier cam assembly associated with the exterior of one of the carrier guides and having a carrier cam member that is receivable by and for engaging one of the carrier cam slots when received thereby;
  wherein each of the cam rollers extends through and is movable within one of cartridge carrier cam slots and which engages one of the carrier cam assemblies associated with the carrier guide of the one cartridge carrier cam slot so that the one carrier cam assembly can move the cartridge carrier towards or away from the data cartridge coupler;
  wherein when the loading and unloading mechanism moves towards the drive door assembly and towards a cartridge unloading position:
    each cartridge carrier cam slot engages the one cam roller so that the cartridge carrier moves towards the drive door assembly and towards the cartridge unloading position;
    each carrier cam assembly causes the cartridge carrier to move away from the data cartridge coupler and to an uncoupled position; and
    each drive door cam slot receives the one drive door cam actuating member and actuates the one drive door cam to a drive door opened position;
  wherein when the loading and unloading mechanism moves away from the drive door assembly and towards a cartridge loading position:
    each cartridge carrier cam slot engages the one cam roller so as to cause the cartridge carrier to move away from the drive door assembly and towards the cartridge loading position;
    each carrier cam assembly causes the cartridge carrier to move towards the data cartridge coupler and to a coupled position; and
    each drive door cam slot engages the one drive door cam actuating member and actuates the one drive door cam to a drive door closed position.

17. The mechanism of claim 16 wherein each cartridge carrier cam slot has a generally L-shaped configuration and comprises a forward longitudinal cam slot segment extending along the longitudinal axis of the carrier guide and having a trailing end, and a rearward transverse cam slot segment extending transversely downward from the trailing end of the longitudinal cam slot segment, and wherein the movement of the cam roller into or out of the transverse segment causes the cartridge carrier to move the data cartridge towards or away from the data cartridge coupler.

18. The mechanism of claim 17, wherein each carrier cam assembly comprises a pair of laterally spaced apart and elongated carrier cams each having upper and lower ends, the lower ends of the pair of carrier cams being pivotally connected by a linking member and the upper ends of each carrier cam having a cam roller slot for receiving one of the cam rollers, and wherein each of the pair of carrier cams is pivotally mounted on one of the carrier guides between the respective lower and upper ends thereof such that the upper ends of the carrier cams can pivot synchronously in response to movement of the cam rollers within the cartridge carrier cam slots.

19. The mechanism of claim 18, which further comprises a carrier transporter having the data cartridge coupler associated therewith and movable towards or away from the drive door assembly between cartridge loaded and unloaded positions, and wherein the pair of carrier guides is associated with the carrier transporter.

20. The mechanism of claim 19, wherein one of the pair of carrier cams is the leading carrier cam and wherein the other of the pair of carrier cams is the trailing carrier cam, and wherein each leading carrier cam has a carrier cam member forward and at the lower end thereof that is receivable by one of the carrier cam slots and for engaging the one carrier cam slot when received thereby for causing the upper ends of each pair of carrier cams to pivot forwardly when the carrier transporter moves laterally forward towards the drive door assembly and to pivot rearwardly when the carrier transporter moves laterally rearward away from the drive door.

21. The mechanism of claim 16 wherein each drive door cam slot is generally J-shaped and has a curved slot segment extending generally downwardly towards a slot access opening for receiving the drive door cam actuating member of the one drive door cam.

22. A data drive comprising:
  a data cartridge coupler;
  a carrier transporter having the data cartridge coupler associated therewith and movable laterally between cartridge loaded and unloaded positions;
  a drive motor assembly for causing the carrier transporter to move laterally between cartridge loaded and unloaded positions;

a data storage cartridge loading and unloading mechanism having a cartridge carrier for releasably receiving a data storage cartridge and for moving the data cartridge towards or away from the data cartridge coupler and for moving the data cartridge laterally between cartridge loaded and unloaded positions;

wherein the cartridge carrier moves the data cartridge towards or away from the data cartridge coupler and moves the data cartridge laterally between cartridge loaded and unloaded positions in response to lateral movement of the carrier transporter, wherein the loading and unloading mechanism further comprises:

at least one carrier guide associated with the carrier transporter for receiving the cartridge carrier and having:
at least one cartridge carrier cam slot; and
cam means for engaging and actuating a drive door cam between drive door closed and opened positions;

a carrier cam assembly associated with the at least one carrier guide for causing the cartridge carrier to move towards or away from the data cartridge coupler;

wherein the cartridge carrier has cam means extending through and movable within the at least one cartridge carrier cam slot and engaging the carrier cam assembly so that the carrier cam assembly can move the cartridge carrier towards or away from the data cartridge coupler;

wherein when the loading and unloading mechanism moves towards the unloading position:
the at least one cartridge carrier cam slot engages the cartridge carrier cam means so that the cartridge carrier moves towards the cartridge unloading position;
the carrier cam assembly causes the cartridge carrier to move away from the data cartridge coupler and to an uncoupled position; and
the carrier guide cam means engages and actuates the drive door cam to a drive door opened position;

wherein when the loading and unloading mechanism moves towards a loading position:
the at least one cartridge carrier cam slot engages the cartridge carrier cam means so as to cause the cartridge carrier to move towards the cartridge loading position;
the carrier cam assembly causes the cartridge carrier to move toward the data cartridge coupler and to a coupled position; and
the carrier guide cam means engages and actuates the drive door cam to a drive door closed position.

23. The drive of claim 22, wherein the at least one carrier cam slot has a generally L-shaped configuration and comprises a forward longitudinal cam slot segment extending along the longitudinal axis of the carrier guide and having a trailing end, and a rearward transverse cam slot segment extending transversely downward from the trailing end of the longitudinal cam slot segment, and wherein the movement of the carrier guide cam means into or out of the transverse segment causes the cartridge carrier to move the data cartridge towards or away from the data cartridge coupler.

24. The drive of claim 23, wherein the cartridge carrier cam means comprises a pair of cam rollers rotatably mounted by the cartridge carrier, wherein the at least one cartridge carrier cam slot comprises a pair of cartridge carrier cam slots, each cam roller extending though one of the cartridge carrier cam slots, wherein the carrier cam assembly comprises a pair of laterally spaced apart and elongated carrier cams each having first and second ends, the first ends of the carrier cams pivotally connected by a linking member and the second ends each having a cam roller slot for receiving one of the cam rollers for movement therein, and wherein each of the carrier cams is pivotally mounted on the at least one carrier guide between the respective first and second ends thereof such that the second ends of the carrier cams can pivot synchronously in response to movement of the cam rollers within the cartridge carrier cam slots.

25. The drive of claim 24, wherein the first ends are lower ends of the carrier cams and wherein the second ends are upper ends of the carrier cams, wherein one of the carrier cams is the leading carrier cam and wherein the other carrier cam is the trailing carrier cam, and wherein the leading carrier cam comprises means for causing the upper ends of the carrier cams to pivot forwardly when the carrier transporter moves laterally forward and to pivot rearwardly when the carrier transporter moves laterally rearward.

26. The drive of claim 24, wherein the at least one carrier guide comprises a pair of laterally and generally parallel spaced apart carrier guides each having an interior and exterior and associated with the carrier transporter and receiving the cartridge carrier between the interiors of the carrier guides, and wherein each carrier guide has a carrier cam assembly associated with the exterior thereof.

27. The drive of claim 22, which further comprises drive door assembly having a drive door movable between closed and opened positions, and at least one drive door cam for moving the drive door between the closed and opened positions and having associated therewith a drive door cam actuating member, and wherein the carrier guide cam means comprises a drive door cam slot for receiving and engaging the drive door cam actuating member to actuate the at least one drive door cam.

28. The drive of claim 22, wherein the cartridge carrier comprises a cartridge shutter opening mechanism having cartridge shutter cam pin for cooperating with a cam slot formed in the data cartridge.

29. The drive of claim 28, wherein the cartridge shutter opening mechanism further comprises a cam sled pin, and wherein the carrier transporter comprises a carrier sled having a carrier sled platform, the carrier sled platform having a shutter opening cam slot formed therein for receiving the cam sled pin.

30. The drive of claim 29, wherein the cartridge shutter opening mechanism opens a shutter of the data cartridge to expose a disk medium only when the drive door is in a fully closed position.

31. A data drive comprising:
a data cartridge coupler;
a carrier transporter having the data cartridge coupler associated therewith and movable laterally between cartridge loaded and unloaded positions;
a drive motor assembly for causing the carrier transporter to move laterally between cartridge loaded and unloaded positions;
a data storage cartridge loading and unloading mechanism having a cartridge carrier for releasably receiving a data storage cartridge and for moving the data cartridge towards or away from the data cartridge coupler and for moving the data cartridge laterally between cartridge loaded and unloaded positions;
wherein the cartridge carrier moves the data cartridge towards or away from the data cartridge coupler and moves the data cartridge laterally between cartridge loaded and unloaded positions in response to lateral movement of the carrier transporter,
wherein the drive motor assembly comprises a motor and gear drive assembly, a rotatable lateral movement transfer member, and a movement transfer responsive member associated with the carrier transporter that imparts lateral movement to the carrier transporter in response to rotation of the lateral movement transfer member, the motor and gear drive assembly causing reciprocal and reversible rotation of the lateral movement transfer member.

32. The drive of claim 31, which further comprises a base plate and a pair of spaced apart guide rails mounted on the base plate, and wherein the carrier transporter comprises a carrier sled that is slidably mounted on the guide rails for lateral movement, wherein the lateral movement member comprises an elongated lead screw rotatably mounted on the base plate, and wherein the movement transfer responsive member comprises a lead screw nut attached to the carrier sled that receives the lead screw and imparts lateral movement to the carrier sled in response to the rotation of the lead screw.

33. A data drive comprising:
   a data cartridge coupler;
   a carrier transporter having the data cartridge coupler associated therewith and movable laterally between cartridge loaded and unloaded positions;
   a drive motor assembly for causing the carrier transporter to move laterally between cartridge loaded and unloaded positions;
   a data storage cartridge loading and unloading mechanism having a cartridge carrier for releasably receiving a data storage cartridge and for moving the data cartridge towards or away from the data cartridge coupler and for moving the data cartridge laterally between cartridge loaded and unloaded positions;
   wherein the cartridge carrier moves the data cartridge towards or away from the data cartridge coupler and moves the data cartridge laterally between cartridge loaded and unloaded positions in response to lateral movement of the carrier transporter,
   wherein the drive motor assembly further causes the carrier transporter to move laterally to an appropriate position for reading/writing data from a disk medium the data cartridge by a read/write head.

* * * * *